US009778358B2

(12) United States Patent
Selzler et al.

(10) Patent No.: US 9,778,358 B2
(45) Date of Patent: Oct. 3, 2017

(54) PULSE DOPPLER RADAR RANGE AND VELOCITY MEASUREMENTS

(71) Applicant: VAISALA, INC., Louisville, CO (US)

(72) Inventors: Jason Selzler, Shirley, MA (US); Evan Ruzanski, Boulder, CO (US); Sergey Panov, Needham, MA (US); Chandrasekar Venkatchalam, Fort Collins, CO (US)

(73) Assignee: Vaisala, Inc., Louisville, CO (US)

( * ) Notice: Subject to any disclaimer, the term of this patent is extended or adjusted under 35 U.S.C. 154(b) by 365 days.

(21) Appl. No.: 14/688,613

(22) Filed: Apr. 16, 2015

(65) Prior Publication Data

US 2016/0306039 A1 Oct. 20, 2016

(51) Int. Cl.
*G01S 13/00* (2006.01)
*G01S 13/95* (2006.01)
*G01S 7/02* (2006.01)
*G01S 13/58* (2006.01)

(52) U.S. Cl.
CPC ............ *G01S 13/95* (2013.01); *G01S 7/024* (2013.01); *G01S 13/581* (2013.01); *G01S 13/951* (2013.01)

(58) Field of Classification Search
CPC .... G01S 113/95; G01S 13/581; G01S 13/951; G01S 7/024
USPC ....................................................... 342/26 R
See application file for complete search history.

(56) References Cited

U.S. PATENT DOCUMENTS

| 5,745,437 | A | 4/1998 | Wachter et al. |
| 6,580,497 | B1 | 6/2003 | Asaka et al. |
| 7,053,813 | B1 | 5/2006 | Hubbert et al. |
| 7,439,899 | B2 | 10/2008 | Stagliano et al. |
| 7,583,222 | B2 | 9/2009 | O'Hora et al. |
| 8,854,250 | B2 | 10/2014 | Keranan et al. |
| 2010/0079330 | A1 | 4/2010 | Venkatachalam et al. |

FOREIGN PATENT DOCUMENTS

WO 2014/171659 A1 10/2014

OTHER PUBLICATIONS

Deng, Z et al., "Doppler ambiguity resolution based on random sparse probing pulses" Apr. 14-15, 2013; In; Radar Conference 2013, IET International, Xi'an, pp. 1-5.*
Bharadwaj, N. and Chandrasekar, V. 2007: Phase Coding for Range Ambiguity Mitigation and Dual-Polarized Doppler Weather Radar. J. Atmos. Oceanic Technol.24, 1351-1363.
Bharadwaj, N., & Chandrasekar, V. (2012). Wideband Waveform Design Principles for Solid-State Weather Radars. Journal of Atmospheric & Oceanic Technology, 29(1), 14-31. doi:10.1175/JTECH-D-11-00030.1.
Unal, C. H., & Moisseev, D. N. (2004). Combined Doppler and Polarimetric Radar Measurements: Correction for Spectrum Aliasing and Nonsimultaneous Polarimetric Measurements. Journal of Atmospheric & Oceanic Technology, 21(3), 443-456.

(Continued)

*Primary Examiner* — Frank J McGue
(74) *Attorney, Agent, or Firm* — Maschoff Brennan

(57) ABSTRACT

Systems and methods are disclosed to determine an unambiguous radial velocity for weather phenomena using weather radar that is not limited by the Doppler Dilemma. Some embodiments include transmitting a complex waveform and using the returned electromagnetic signal to determine the unambiguous radial velocity.

20 Claims, 14 Drawing Sheets

(56) References Cited

OTHER PUBLICATIONS

Doviak, R., Zrnic, S.,1993: Doppler Radar and Weather Observations, 2nd Edition. Acedemic Pres, section 7.4.2 p. 170-71.
Zhang, Y., et al., "Doppler Ambiguity Resolution Based on Random Sparse Probing Pulses", In IET International Radar Conference, Hindawi Publishing Corporation, Journal of Electrical and Computer Engineering, vol. 2015, Apr. 14-16, 2013, pp. 1-8.
International Search Report and Written Opinion of the International Searching Authority mailed Jun. 20, 2016, as received in Application No. PCT/US16/23292 (9 pages).

* cited by examiner

PULSE DOPPLER RADAR RANGE AND VELOCITY MEASUREMENTS

SUMMARY

Embodiments of the invention include a weather radar system that includes a waveform generator, a modulator, one or more polarizers, one or more amplifiers, a first transmitter, a second transmitter, a receiver, and a processor. The waveform generator, for example, may be configured to generate a first waveform centered around a first frequency and a second waveform centered around the first frequency. The modulator may be configured to modulate the first waveform to include a first non-linear frequency modulation and modulate the second waveform to include a second non-linear frequency modulation. The one or more polarizers may be configured to polarize the first waveform to include a first polarization state and polarize the second waveform to include a second polarization state. The one or more amplifiers may be configured to amplify the first waveform and the second waveform. The first transmitter may be configured to transmit the first waveform as a first electromagnetic pulse into an environmental region. The second transmitter may be configured to transmit the second waveform as a second electromagnetic pulse into the environmental region. The second electromagnetic pulse may be transmitted within 100 nanoseconds of the completion of the transmission of the first electromagnetic pulse. The receiver may be configured to receive an electromagnetic signal reflected from within the environmental region. The processor may be configured to processes the received electromagnetic signal using pulse compression techniques and determine a radial velocity an environmental object of interest within the environmental region based at least in part on the processed electromagnetic signal.

In some embodiments, the one or more amplifiers comprise one or more solid state amplifiers.

In some embodiments, the one or more amplifiers comprise a first solid state amplifier configured to amplify the first waveform and a second solid state amplifier configured to amplify the second waveform.

In some embodiments, the received electromagnetic signal includes a first signal corresponding with the first waveform and a second signal corresponding with the second waveform, wherein the processor may be further configured to determine the radial velocity using pulse pair processing.

In some embodiments, the processor may be configured to determine a radial velocity less than a maximum radial velocity, wherein the maximum radial velocity may be determined from a function that may be directly proportional to a wavelength of the received electromagnetic signal and inversely proportional to a pulse interval time of the received electromagnetic signal.

In some embodiments, the waveform generator may be configured to generate a third waveform centered around the first frequency and generate a fourth waveform centered around the first frequency. In some embodiments, the modulator may be configured to modulate the third waveform to include a third non-linear frequency modulation and modulate the fourth waveform to include a fourth non-linear frequency modulation. In some embodiments, the one or more polarizers may be configured to polarize the third waveform to include the first polarization state and polarize the fourth waveform to include the second polarization state; In some embodiments, the one or more amplifiers configured to amplify the third waveform and the fourth waveform. In some embodiments, the first transmitter may be configured to transmit the third waveform as a third electromagnetic pulse into the environmental region, wherein the third waveform may be transmitted into the environmental region a predetermined period of time after the second waveform has been transmitted into the environmental region. In some embodiments, the second transmitter may be configured to transmit the fourth waveform as a fourth electromagnetic pulse into the environmental region, wherein the fourth electromagnetic pulse may be transmitted within 100 nanoseconds of the completion of the transmission of the third electromagnetic pulse. In some embodiments, the receiver may be configured to receive a second electromagnetic signal reflected from the environmental region. In some embodiments, the processor may be configured to process the second electromagnetic signal using pulse compression techniques, and determine a radial velocity and a range of an environmental object of interest within the environmental region based at least in part on the processed second electromagnetic signal.

In some embodiments, the waveform generator may be configured to generate a third waveform centered around the first frequency and generate a fourth waveform centered around the first frequency. In some embodiments, the modulator may be configured to modulate the third waveform to include a third non-linear frequency modulation and modulate the fourth waveform to include a fourth non-linear frequency modulation. In some embodiments, the one or more polarizers may be configured to polarize the third waveform to include the second polarization state and polarize the fourth waveform to include the first polarization state. In some embodiments, the one or more amplifiers configured to amplify the third waveform and the fourth waveform. In some embodiments, the first transmitter may be configured to transmit the third waveform as a third electromagnetic pulse into the environmental region, wherein the third waveform may be transmitted into the environmental region a predetermined period of time after the second waveform has been transmitted into the environmental region. In some embodiments, the second transmitter may be configured to transmit the fourth waveform as a fourth electromagnetic pulse into the environmental region, wherein the fourth electromagnetic pulse may be transmitted within 100 nanoseconds of the completion of the transmission of the third electromagnetic pulse. In some embodiments, the receiver may be configured to receive a second electromagnetic signal reflected from the environmental region. In some embodiments, the processor may be configured to processes the second electromagnetic signal using pulse compression techniques, and determine a radial velocity and a range of an environmental object of interest within the environmental region based at least in part on the processed second electromagnetic signal.

In some embodiments, the waveform generator may be configured to generate a filling waveform centered around a second frequency. In some embodiments, the one or more amplifiers configured to amplify the filling waveform. In some embodiments, either or both the first transmitter and the second transmitter may be configured to transmit the filling waveform as a third electromagnetic pulse into the environmental region, wherein the third waveform may be transmitted into the environmental region a predetermined period of time after the second waveform has been transmitted into the environmental region.

In some embodiments, the waveform generator may be configured to generate a first filling waveform centered around a second frequency and a second filling waveform centered around the second frequency. In some embodiments, the one or more polarizers may be configured to polarize the first filling waveform to include the first polarization state and polarize the second filling waveform to include the second polarization state. In some embodiments, the one or more amplifiers configured to amplify the first filling waveform and the second filling waveform. In some embodiments, the first transmitter may be configured to transmit the first filling waveform as a third electromagnetic pulse into the environmental region, wherein the first filling waveform may be transmitted into the environmental region a predetermined period of time after the second waveform has been transmitted into the environmental region. In some embodiments, the second transmitter may be configured to transmit the second filling waveform as a fourth electromagnetic pulse into the environmental region, wherein the second filling waveform may be transmitted into the environmental space.

In some embodiments, the received electromagnetic signal includes a first signal corresponding with the first waveform and a second signal corresponding with the second waveform, wherein the processor may be further configured to determine an unfolding factor from the first signal and the second signal.

A method is also disclosed that includes generating a first waveform centered around a first frequency, having a first phase coding, and having a first polarization state; generating a second waveform centered around the first frequency, having a second phase coding, and having a second polarization state, wherein the first polarization state and the second polarization state are orthogonal, and wherein the first phase coding and the second phase coding are different; amplifying the first waveform and the second waveform; transmitting the first waveform as a first electromagnetic pulse into an environmental region using a first transmitter; transmitting the second waveform as a second electromagnetic pulse into the environmental region using a second transmitter, wherein the second electromagnetic pulse may be transmitted within 100 nanoseconds of the completion of the transmission of the first electromagnetic pulse; receiving a received electromagnetic signal reflected from the environmental region; processing the received electromagnetic signal using pulse compression techniques; and determining a radial velocity of an environmental object of interest within the environmental region based at least in part on the processed electromagnetic signal.

In some embodiments, the received electromagnetic signal includes a first signal corresponding with the first waveform and a second signal corresponding with the second waveform, wherein determining the radial velocity includes determining the radial velocity using pulse pair processing.

In some embodiments, generating the first waveform centered around a first frequency further comprises modulating the first waveform with the first phase coding comprising a non-linear frequency modulation. In some embodiments, generating the second waveform centered around a first frequency further comprises modulating the second waveform with the second phase coding comprising a non-linear frequency modulation.

In some embodiments, generating the first waveform centered around a first frequency further comprises polarizing the first waveform to include the first polarization state. In some embodiments, generating the second waveform centered around a first frequency further comprises polarizing the second waveform to include the second polarization state.

In some embodiments, the first waveform may be amplified using a first solid state amplifier and the second waveform may be amplified using a second solid state amplifier.

In some embodiments, a portion of the received electromagnetic signal includes an electromagnetic signal in the first polarization state and a portion of the received electromagnetic signal includes an electromagnetic signal in the second polarization state.

In some embodiments, a maximum radial velocity may be determined from a function that may be directly proportional to a wavelength of the received electromagnetic signal and inversely proportional to a pulse interval time of the received electromagnetic signal.

In some embodiments, the method may further include waiting a predetermined period of time after transmitting the second electromagnetic pulse; generating a third waveform centered around the first frequency, having a third phase coding, and having the first polarization state; generating a fourth waveform centered around the first frequency, having a fourth phase coding, and having the second polarization state, wherein the third phase coding and the fourth phase coding are different; amplifying the third waveform and the fourth waveform; transmitting the third waveform as a third electromagnetic pulse into an environmental region using the first transmitter; and transmitting the fourth waveform as a fourth electromagnetic pulse into the environmental region using the second transmitter, wherein the fourth electromagnetic pulse may be transmitted within 100 nanoseconds of the completion of the transmission of the third electromagnetic pulse.

In some embodiments, the method may further include waiting a predetermined period of time after transmitting the second electromagnetic pulse; generating a third waveform centered around the first frequency, having a third phase coding, and having the second polarization state; generating a fourth waveform centered around the first frequency, having a fourth phase coding, and having the first polarization state, wherein the third phase coding and the fourth phase coding are different; amplifying the third waveform and the fourth waveform; transmitting the third waveform as a third electromagnetic pulse into an environmental region using the first transmitter; and transmitting the fourth waveform as a fourth electromagnetic pulse into the environmental region using the second transmitter, wherein the fourth electromagnetic pulse may be transmitted within 100 nanoseconds of the completion of the transmission of the third electromagnetic pulse.

In some embodiments, the method may further include generating a filling waveform centered around a second frequency, wherein the filling waveform comprises both a horizontal polarization state and a vertical polarization state; amplifying the filling waveform; and transmitting the filling waveform as a third electromagnetic pulse into the environmental region, wherein the third electromagnetic pulse may be transmitted within 100 nanoseconds of the completion of the transmission of the second electromagnetic pulse.

In some embodiments, the method may further include generating a first filling waveform centered around a second frequency, wherein the first filling waveform comprises a first polarization state; generating a second filling waveform centered around a second frequency, wherein the second filling waveform comprises a second polarization state, wherein the first polarization state and the second polarization state are orthogonal; amplifying the first filling waveform and the second filling waveform; transmitting the first filling waveform as a third electromagnetic pulse into the environmental region, wherein the third electromagnetic pulse may be transmitted within 100 nanoseconds of the completion of the transmission of the second electromagnetic pulse; and transmitting the second filling waveform as a fourth electromagnetic pulse into the environmental region, wherein the fourth electromagnetic pulse may be transmitted within 100 nanoseconds of the completion of the transmission of the second electromagnetic pulse.

In some embodiments, either the first polarization state or the second polarization state comprises a horizontal polarization state, and wherein either the first polarization state or the second polarization state comprises a vertical polarization state.

In some embodiments, the second electromagnetic pulse may be transmitted within 10 nanoseconds of the completion of the transmission of the first electromagnetic pulse.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
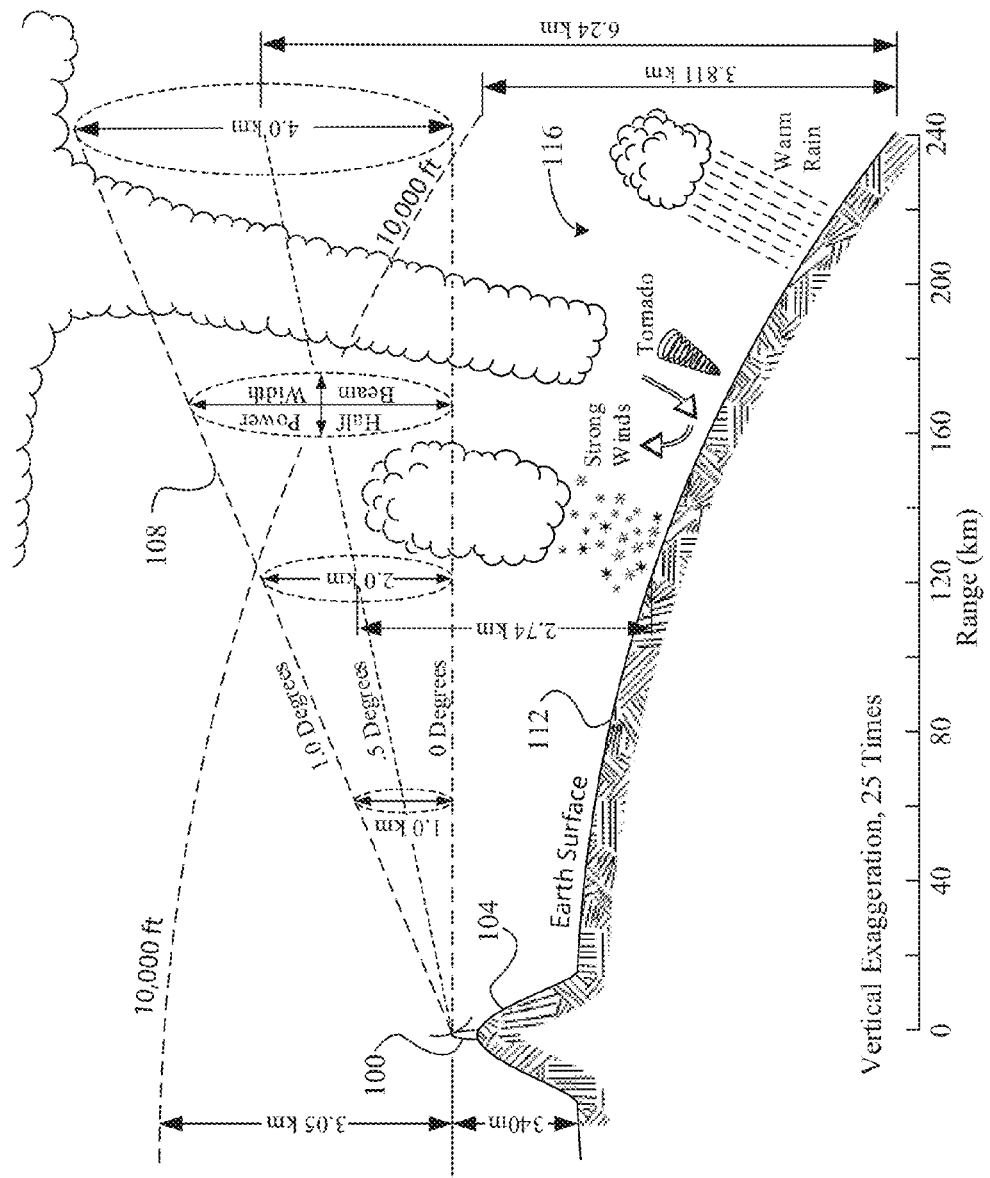
FIG. 1 provides a schematic illustration of the operation of a conventional radar system (reproduced from the National Academy of Sciences Report, "Flash flood forecasting over complex terrain").

One of the fundamental objectives of meteorological radar systems is to sample the atmosphere surrounding the Earth to provide a quantitative measure of environmental phenomena. Conventional meteorological radars provide coverage over long ranges, often on the order of hundreds of kilometers. A general schematic of how such conventional radar system 100 may function is provided in FIG. 1. In this example, the radar system 100 is disposed at the peak of a raised geographical feature such as a tower, hill, or mountain 104. The radar system 100 generates an electromagnetic beam 108 that disperses approximately linearly with distance, with the drawing showing how the width of the electromagnetic beam 108 thus increases with distance from the radar system 100. Various examples of weather patterns 116 that might exist and which the radar system 100 attempts to sample are shown in different positions above the surface 112 of the Earth.

One of the problems associated with meteorological radar systems is the Doppler Dilemma, which is a fundamental constraint for pulsed Doppler weather radar systems. During operation a pulsed radar system transmits a first electromagnetic pulse of electromagnetic energy and then waits and collects electromagnetic energy scattered from the environment to return to the radar system. Eventually the radar system emits another electromagnetic pulse of energy, which effectively ends the period of time the radar system can wait and collect electromagnetic energy scattered form the environment in response to the prior pulse. When the radar is measuring energy returned after transmission of the second electromagnetic pulse, the energy being received may actually still be from targets reflecting energy from the first electromagnetic pulse or any previous pulse(s). Despite this, it is typically assumed that all energy being measured is from the most recently transmitted pulse such as, for example, the second electromagnetic pulse. A measure called the maximum unambiguous range ($R_{max}$), which is the time it takes RF energy to travel to some range and return to the radar system prior to the next transmission of a pulse, $R_{max}=c/2(PRF)$, can be derived, where c is the speed of light, and PRF is the Pulse Repetition Frequency (or number of pulses per second). Thus, the maximum range of a radar system is a function of the number of pulses transmitted per period of time.

When the radar system emits a pulse and measures the returned energy the amplitude and the phase of returned energy can be measured. When comparing the difference of the phase measurement of two successive pulses (e.g., the first electromagnetic pulse and the second electromagnetic pulse) a radial velocity of the target can be derived. The phase measurement may encompass one or more cycles of the Nyquist interval, so the phase difference can be assumed to be within the Nyquist interval. The Nyquist interval may limit the maximum measurable velocity ($v_{max}$), which can be represented as $v_{max}=\pm PRF\lambda/c$, where $\lambda$ is wavelength of radar system, PRF is the Pulse Repetition Frequency and c is the speed of light.

Figure 2:
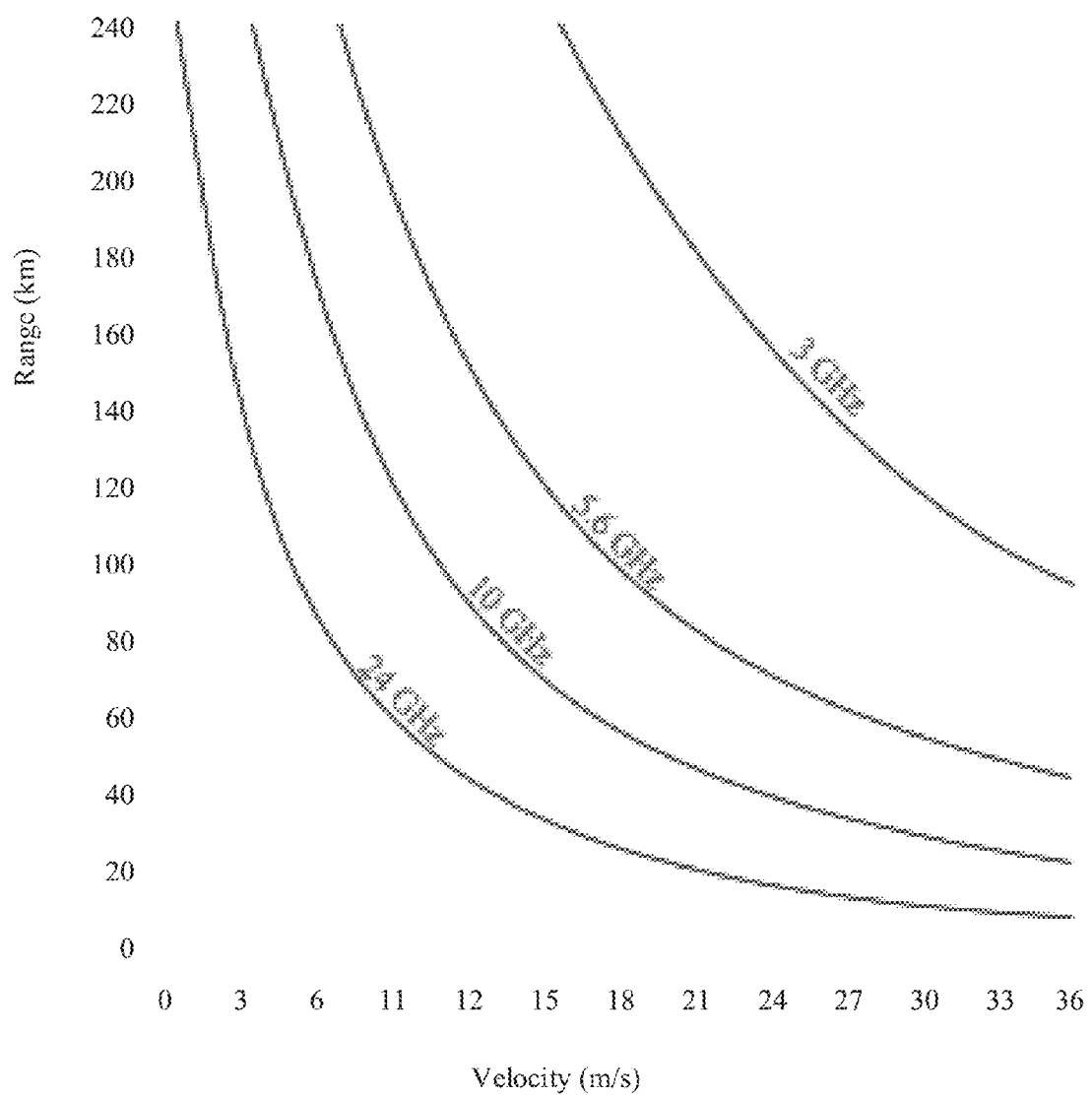
FIG. 2 is a chart depicting the Doppler Dilemma.

The Doppler Dilemma is related to the PRF being directly proportional to $v_{max}$ and inversely proportional to $R_{max}$. A radar system can measure greater maximum measurable velocity by using a greater PRF, but by so doing the maximum range is decreased. FIG. 2 is a chart depicting the Doppler Dilemma for a number of frequencies often employed in weather radar systems, X- (9.0 GHz), C- (5.4 GHz), or S-band (2.8 GHz). As shown in the figure, without decoupling the PRF from either or both the range and the velocity calculations, it is impossible to meet both the range and velocity requirements simultaneously for a given PRF.

Some embodiments of the invention overcome the Doppler Dilemma by removing the PRF parameter from either $R_{max}$ or $v_{max}$, which may allow for measurement of radial velocities across all or most ranges and velocity ranges such as, for example, the ranges that may be useful for monitoring severe weather at ranges of several hundred kilometers.

In some embodiments, the Doppler Dilemma may be overcome by transmitting a complex waveform into an environmental region. A complex waveform may include a first waveform and a second waveform. The first waveform and the second waveform may be centered around the same frequency (e.g., a first frequency). The first waveform may have either or both of a first phase coding and a first polarization state. The second waveform may have either or both a second phase coding and a second polarization state. The first polarization state and the second polarization state may be orthogonal to each other. For example, the first waveform may be horizontally polarized and the second waveform may be vertically polarized, or vice versa. In some embodiments, the first phase coding and the second phase coding may be different. In some embodiments, the first phase coding and the second phase coding may include modulation such as, for example, frequency modulation, phase modulation, non-linear frequency modulation, pseudo-random encoding, SZ2 phase encoding Costas code, linear frequency modulation, phase-coded pulse compression, Barker code, Frank code, Gray code, Zadoff-Chu sequence, etc. The first waveform and the second waveform may be combined and transmitted as a complex waveform with a time period of less than 100 ns, 50 ns, 25 ns, 10 ns, 5 ns, 1 ns, etc. between pulses. In some embodiments, the complex waveform may include a filling waveform.

Some embodiments include methods and/or systems that use polarization modulation to encode two time-spaced sub-pulses within a complex pulsed waveform as a means to attain higher unambiguous Doppler velocity. In some embodiments, pulse-pair processing may be used to compute radial velocity. In some embodiments, Non-Linear Frequency Modulation (NLFM) Pulse Compression techniques may be used to achieve the needed sensitivity.

Figure 3:
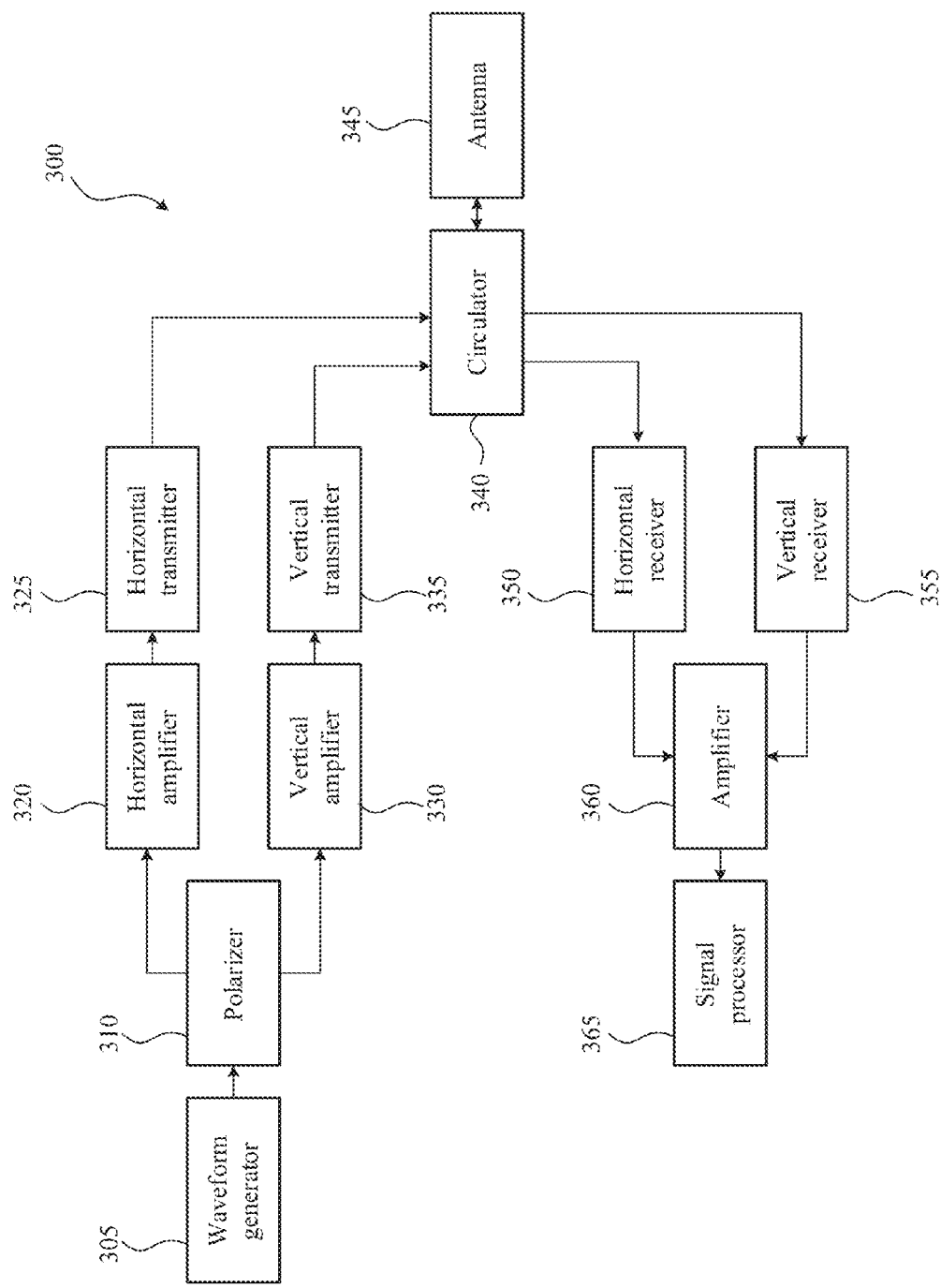
FIG. 3 is a block diagram of a radar system according to some embodiments described in this document and/or the figures.

FIG. 3 is a block diagram of a radar system 300 (e.g., radar system 100) according to some embodiments described in this document and/or the figures. The radar system 300 may include a waveform generator 305. The waveform generator 305 may include any device that can generate repeating or non-repeating electronic signals (e.g., a waveform) in either the analog or digital domains. In some embodiments, the waveform generator 305 may generate a waveform with predefined amplitude and/or phase modulations. In some embodiments, the waveform generator 305 may produce a waveform having a complex structure that may be used in pulse compression. The waveform generator 305 may also phase code the waveform such as, for example, with pseudo-random encoding, SZ2 phase encoding, frequency modulation, phase modulation, non-linear frequency modulation, Costas code, linear frequency modulation, phase-coded pulse compression, or any other coding. In some embodiments, the waveform generator 305 may produce nonlinear frequency modulated pulses.

In some embodiments, the radar system 300 may include a polarizer 310. The polarizer 310 may polarize the waveform received from the waveform generator 305 into two orthogonally polarized waveforms such as, for example, a vertically polarized waveform and a horizontally polarized waveform. Any type of polarizer may be used. In some embodiments, the polarizer 310 may modulate the waveform with vertical and horizontal polarization modulation. In some embodiments, the polarizer may polarize the waveform after the waveform has been coded with a pulse compression coding. Alternatively or additionally, the polarizer may polarize the waveform before the waveform has been coded with a pulse compression coding In some embodiments, the radar system 300 may include a horizontal amplifier 320 and a vertical amplifier 330. In some embodiments, the horizontal amplifier 315 may be a solid state power amplifier and/or the vertical amplifier 330 may be a solid state power amplifier. A solid state power amplifier may amplify signals with their respective polarization from the polarizer 310 to a power above 10 W at frequencies between 1 kHz and 100 GHz. In some embodiments, a solid state power amplifier may include a coherent linear amplifier. In some embodiments, a solid state power amplifier may include an amplifier (e.g., a coherent linear amplifier) with a 10% duty cycle.

In some embodiments, the horizontal amplifier 320 may be coupled with a horizontal transmitter 325. In some embodiments, the vertical amplifier 330 may be coupled with a vertical transmitter 335. In some embodiments, the vertical transmitter 335 and the horizontal transmitter 325 may transmit waveforms in the L-band, S-band, C-band, X-band, or K-band.

In some embodiments, the radar system 300 may include a circulator 340 that may be used to isolate the signals from the horizontal transmitter 325 and the vertical transmitter 335 from the signals received at the antenna 345.

In some embodiments, the antenna 345 may include any type of antenna that may be used transmit electromagnetic signals into the environmental region and receive electromagnetic signals reflected from atmospheric phenomena within the environmental region. In some embodiments, the antenna 345 may include a mechanically aimed antenna and/or an active phase array.

In some embodiments, the radar system 300 may include a horizontal receiver 350, and a vertical receiver 355 that are coupled with the circulator 340. Signals received from the antenna 345 may be sent to the horizontal receiver 350 and the vertical receiver 355.

In some embodiments, the radar system 300 may include an amplifier 360 coupled with the horizontal receiver 350 and the vertical receiver 355. In some embodiments, the an amplifier 360 may include a horizontal amplifier that may be used to amplify the horizontal signal form the horizontal receiver 350 and a vertical amplifier that may be used to amplify the vertical signal form the vertical receiver 355.

In some embodiments, the radar system 300 may include a signal processing module 365 that perform any number of functions such as, for example, pulse compression processing, digital to analog conversion, pulse pair processing, etc. The signal processing module 365, for example, may include one or more components of the computational unit 1300 shown in FIG. 13. In some embodiments, the signal processing module 365 may be used to calculate the radial velocity, spectral width estimation, power, range, etc. of a weather feature from one or more signals received from the horizontal receiver 350 and/or the vertical receiver 355.

Figure 4:
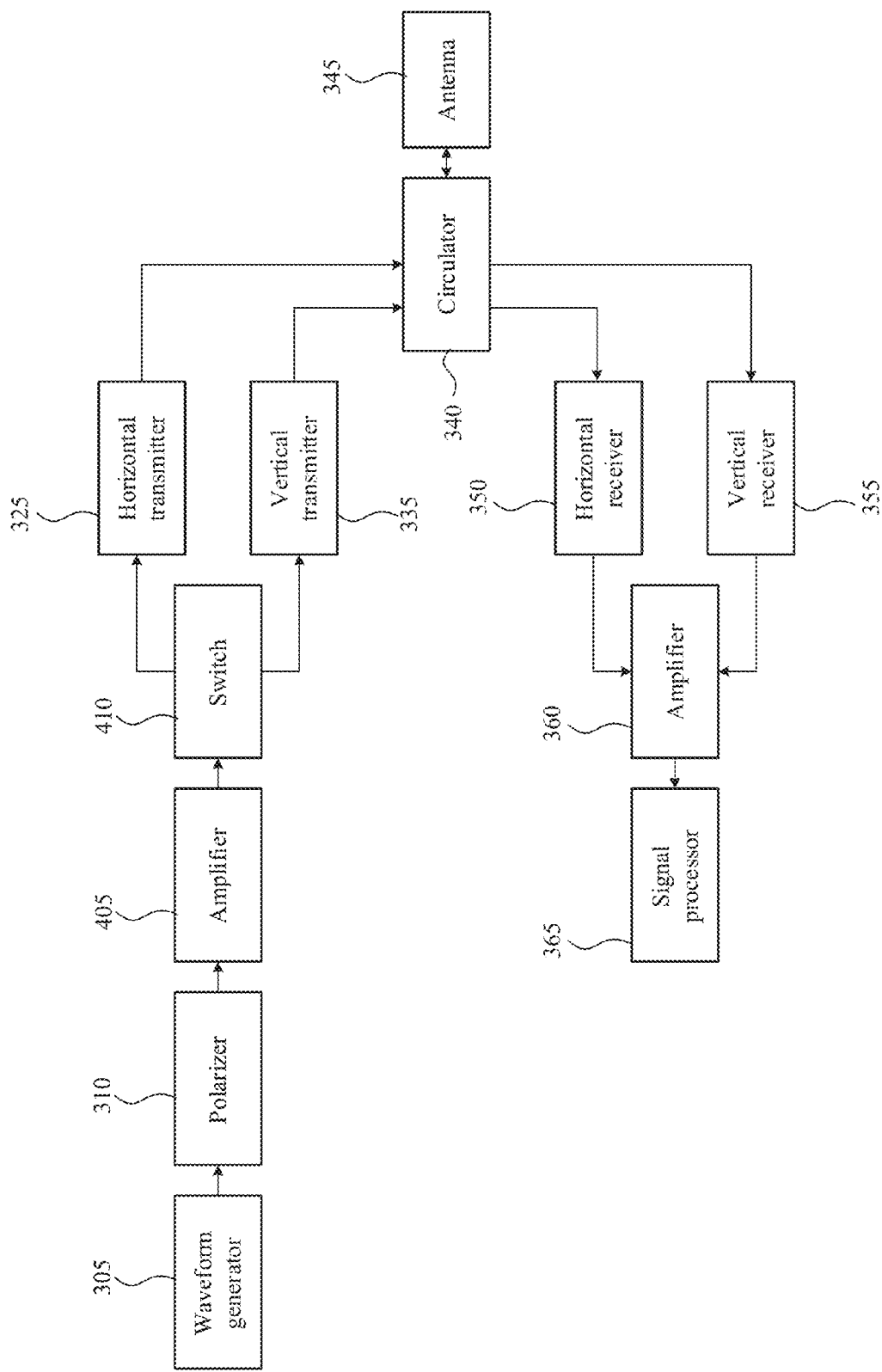
FIG. 4 is another block diagram of a radar system according to some embodiments described in this document and/or the figures.

FIG. 4 is another block diagram of a radar system 400 (e.g., radar system 100) according to some embodiments described in this document and/or the figures. The radar system 400 may include the waveform generator 305 and the polarizer 310. A single amplifier 405 may be used to amplify all signals regardless of their polarization state. After amplification and polarization, a switch 410 may be used to direct horizontal pulses to the horizontal transmitter 325 or direct vertical pulses to the vertical transmitter 335.

While radar system 400 and radar system 300 are described in accordance with various embodiments, various other radar systems with various other components, functional elements, etc. may be used.

In some embodiments, pulse compression techniques may be used to produce pulses with large enough pulse energy to ensure a good SNR at the receiver but without poor range resolution. In some embodiments, pulse compression techniques may include pulse compression by frequency modulation or pulse compression by phase coding. In pulse compression frequency modulation, for example, a finite length pulse, with amplitude that has a rectangle function, the amplitude may sweep a frequency band around the carrier frequency. Pulse compression by frequency modulation may include linear frequency modulation, chirp radar modulation, non-linear frequency modulation, time-frequency-coded waveform modulation, and/or Costas code modulation.

Alternatively or additionally, in pulse compression by phase coding, where a pulse is divided in a number, N, time slots of a fixed duration, T/N. In some embodiments, polyphase coding and/or binary coding may also be used.

In some embodiments, any type of pulse compression technique may be used.

Figure 5A:
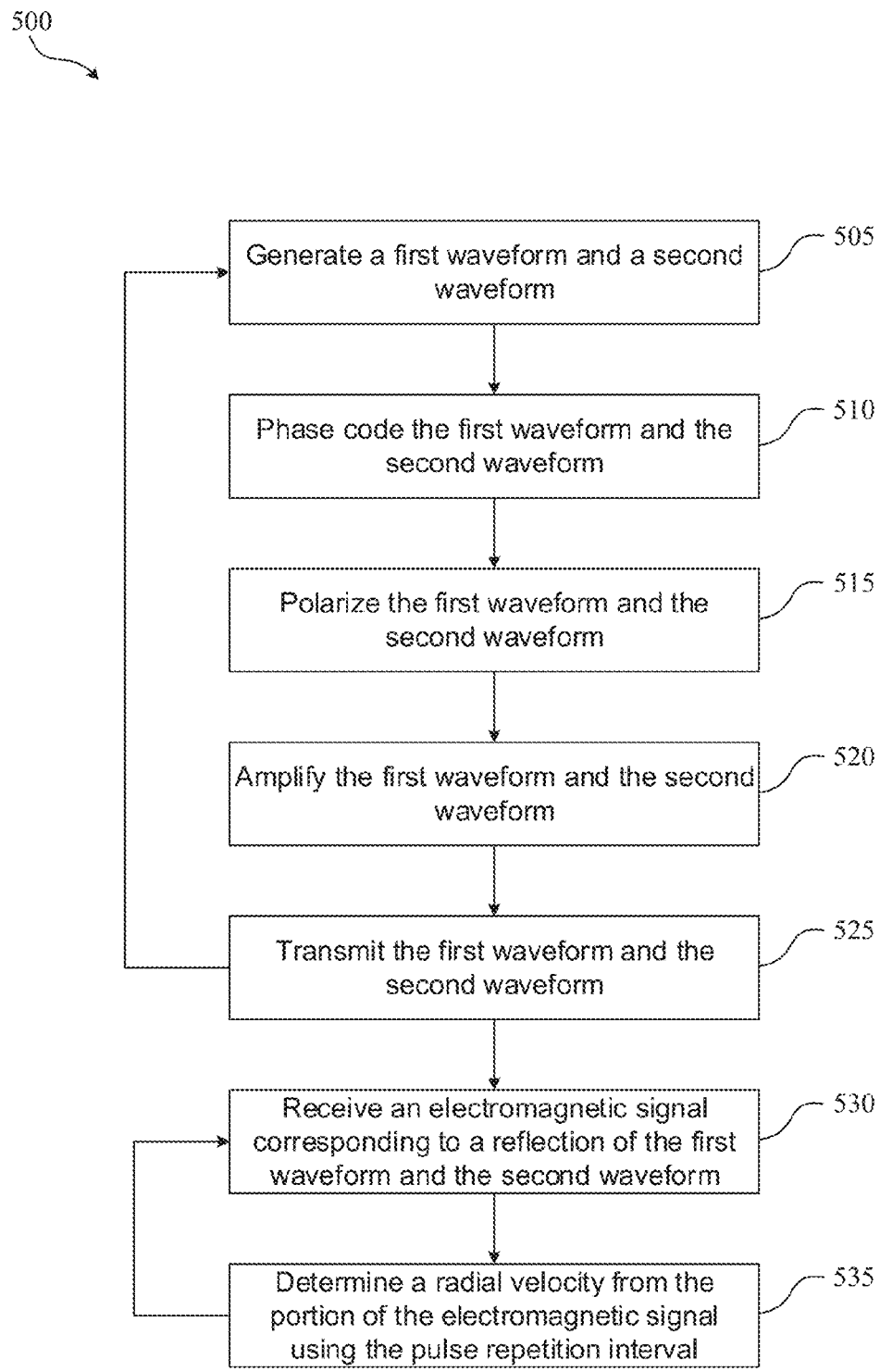
FIG. 5A is a flowchart of a method for measuring environmental objects with a complex radar waveform according to some embodiments described in this document and/or the figures.

FIG. 5A is a flowchart of a method 500 for measuring environmental objects with a complex radar waveform according to some embodiments. One or more steps of the method 500 may be implemented, in some embodiments, by one or more components of radar system 300 of FIG. 3 or radar system 400 or of FIG. 4. Although illustrated as discrete blocks, various blocks may be divided into additional blocks, combined into fewer blocks, or eliminated, depending on the desired implementation.

The method 500 may begin at block 505 where a first waveform and a second waveform are generated. The first waveform may be centered around a first frequency and the second waveform may also be centered around the first frequency. The first waveform and the second waveform may include any shape and/or frequency. In some embodiments, the first waveform and the second waveform may be generated using the waveform generator 305 of FIG. 3 and/or FIG. 4.

The method 500 may include a transmit sub-method comprising blocks 505, 510, 515, 520, and 525; and a receive sub-method comprising blocks 530, 535, and 540.

In some embodiments the first waveform and the second waveform may have a pulse length of less than 100 μs.

At block 510 the first waveform may be encoded with a first phase coding and the second waveform may be encoded with a second phase coding. In some embodiments, the first phase coding and the second phase coding may be different. In some embodiments, the first phase coding and/or the second phase coding may include modulation such as, for example, frequency modulation, phase modulation, nonlinear frequency modulation, Costas code, linear frequency modulation, phase-coded pulse compression, etc. In some embodiments, the first phase coding and the second phase coding may have different coding techniques, coding parameters, amplitudes, phases, frequencies, etc. In some embodiments, the first waveform may be encoded with the first phase coding and the second waveform may be encoded with the second phase coding using the waveform generator 305 of FIG. 3 and/or FIG. 4.

At block 515 the first waveform may be polarized with a first polarization state and the second waveform may be polarized with a second polarization state. In some embodiments, the first polarization state and the second polarization state may be orthogonal such as, for example, the first polarization state may be horizontal and the second polarization state may be vertical or vice versa. As another example, the first polarization state may be circular and the second polarization state may be orthogonal. In some embodiments, the first waveform may be polarized and the second waveform may be polarized with the polarizer 310 shown in FIGS. 3 and 4.

At block 520 the first polarized waveform and the second polarized waveform may be amplified. In some embodiments, the first polarized waveform may be amplified with a first amplifier (e.g., vertical amplifier 330 shown in FIG. 3) and the second polarized waveform may be amplified with a second amplifier (e.g., horizontal amplifier 320 shown in FIG. 3).

At block 525 the first waveform and the second waveform are transmitted into an environmental region using an antenna such as, for example, the antenna 345. In some embodiments, the first waveform may be sent prior to the second waveform. In some embodiments, the second waveform may be sent prior to the first waveform. In some embodiments, the time between transmission of the first waveform and the second waveform may be less than 150 nanoseconds. In some specific embodiments, the time between transmission of the first waveform and the second waveform may be less than 100 nanoseconds. In some specific embodiments, the time between transmission of the first waveform and the second waveform may be less than 50 nanoseconds. In some specific embodiments, the time between transmission of the first waveform and the second waveform may be less than 20 nanoseconds. In some embodiments, the first waveform and the second waveform in combination may be considered a complex waveform.

Figure 6:
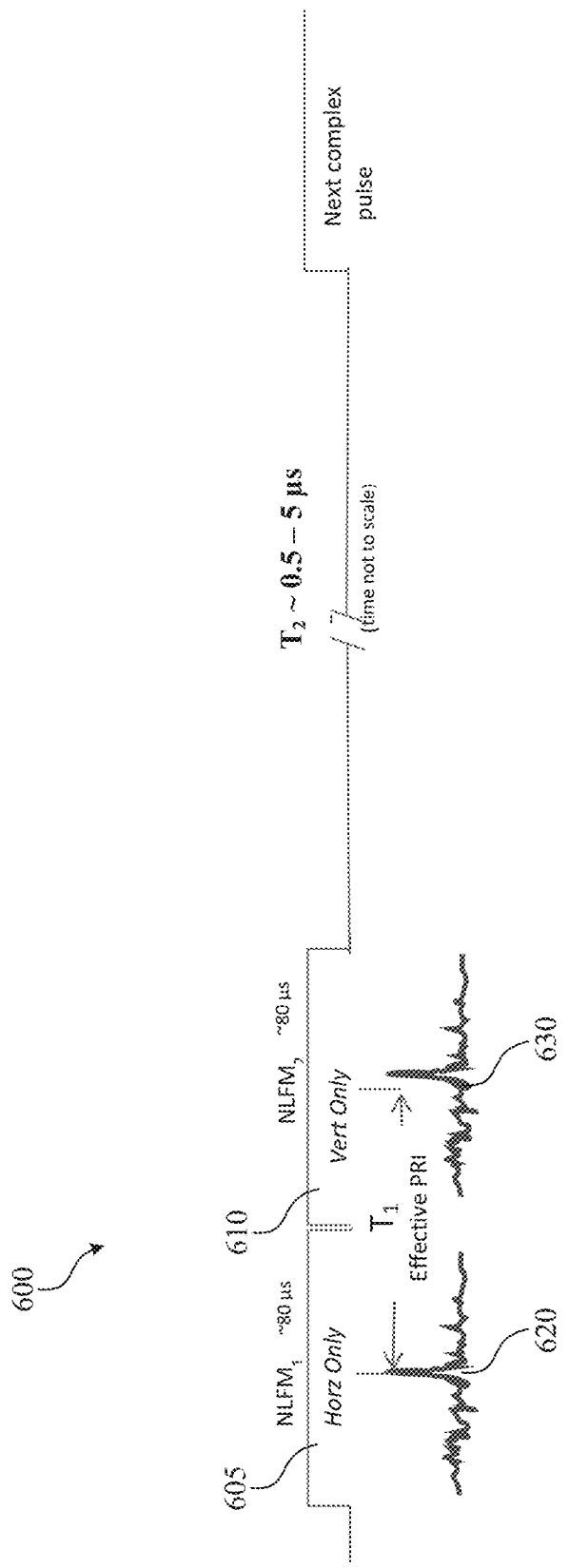
FIG. 6 shows a complex radar waveform according to some embodiments described in this document and/or the figures.

FIG. 6 shows an example of a complex radar waveform 600. The complex waveform 600 includes the first waveform 605 and the second waveform 610. In this example, the first waveform 605 is a horizontally polarized waveform with nonlinear frequency modulation and the second waveform 610 is a vertically polarized waveform with nonlinear frequency modulation that is different than the nonlinear frequency modulation of the first waveform 605.

Returning to FIG. 5A, after block 525 the method 500 may return to block 505. The method 500 may wait a period of time after transmission of the first waveform and transmission of the second waveform before another transmission is made. In some embodiments, the period of time may be more than 1 ms, 10 ms, 50 ms, etc.

Additionally or alternatively, method 500 may proceed to block 530 where scattered and/or reflected electromagnetic radiation is received from the antenna. The electromagnetic radiation may correspond with the transmitted first wave and the transmitted second waveform reflected from an object (or a weather feature) in the environmental space.

Various signal processing techniques may be used to process the signal. For example, pulse compression techniques may be used to process the received signal. In some embodiments, the horizontal polarization state of the received signal and the vertical polarization state of the received signal may be processed separately to produce a horizontally polarized pulse compression signal and a vertically polarized pulse compression signal. In some embodiments, the received electromagnetic signal may be filtered and/or amplified.

FIG. 6 also illustrates examples of a horizontally polarized pulse compression signal 620 and a vertically polarized pulse compression signal 630. The horizontally polarized pulse compression signal 620 may have a central peak and the vertically polarized pulse compression signal 630 may also have a central peak. The time distance between these two peaks is the effective pulse repetition interval of the complex waveform 600. In some embodiments, the effective pulse repetition interval may depend on the amount of compression applied to the pulses in block 510 of method 500 and/or the amount of time between transmissions of the two pulses. In some embodiments, the effective pulse repetition interval may be on the order of the pulse width of the pulses transmitted in block 525.

Returning to FIG. 5A, the method 500 may proceed to block 535 where a first radial velocity of an object or an atmospheric phenomenon in the environmental space is determined using the portion of the electromagnetic signal corresponding with the first waveform reflected from the object or the atmospheric phenomenon. In some embodiments, the radial velocity determination may not be coupled via or limited to the Doppler Dilemma. In some embodiments, the first radial velocity determination may be determined based on a function comprising the effective pulse repetition interval.

In some embodiments, the first radial velocity may be determined from a function of the effective pulse repetition interval such as, for example, $$v = \frac{\lambda}{4PRI}.$$

In some embodiments, the autocorrelation estimate may be determined from:

$$\hat{R}(T_s) = \frac{1}{2M} \sum_{i=1}^{M} (H^*_{2i} V_{2i+1} + V^*_{2i+1} V H_{2i+2})$$

Summing the two products and representing them by $\hat{R}_a$, and $\hat{R}_b$, it can be shown that the true value of the estimates is the sum of the phases due to Doppler phase shift ($\phi_D$) and two-way differential propagation phase shift ($\varnothing_{DP}$), and that the magnitude of $R_a$ and $R_b$ are equal resulting in a simplified expression:

$$\hat{R}(T_s) = |R_\alpha| \cos(\varnothing_{DP}) e^{j\phi_D}.$$

$\varnothing_{DP}$ may be estimated using any technique known in the art.

In some embodiments, the $\varnothing_{DP}$ phase shift may be larger than the Doppler phase shift, $\phi$, within the complex pulse. $\varnothing_{DP}$ may be a noisy quantity from range bin to range bin due to target scattering effects. Thus when removing the $\varnothing_{DP}$ phase component from the total phase shift to derive the Doppler shift the resultant may be less accurate than a pulse pair between co-polar received powers from successive complex pulses. Due to the limited Nyquist interval, the pulse to pulse radial velocity may be folded one or more times. $\phi$, for example, may be derived from the single complex pulse to estimate how much unfolding is required.

In some embodiments, the radial velocity may be determined from the phase relationship between pulses received at the radar. Data folding may result from overlaid echoes, second echoes, attenuation along a beam, etc. Various techniques may be used to determine an unfolding factor that may be used to unfold the data. In some embodiments, an unfolding factor for radial velocities may be determined using the received waveform from sequential electromagnetic pulses received at the radar.

After block 535, the method 500 may then return to block 530 and receive another electromagnetic signal. In some embodiments, block 530 may be continuously receiving electromagnetic signals from the environmental space.

Figure 12:
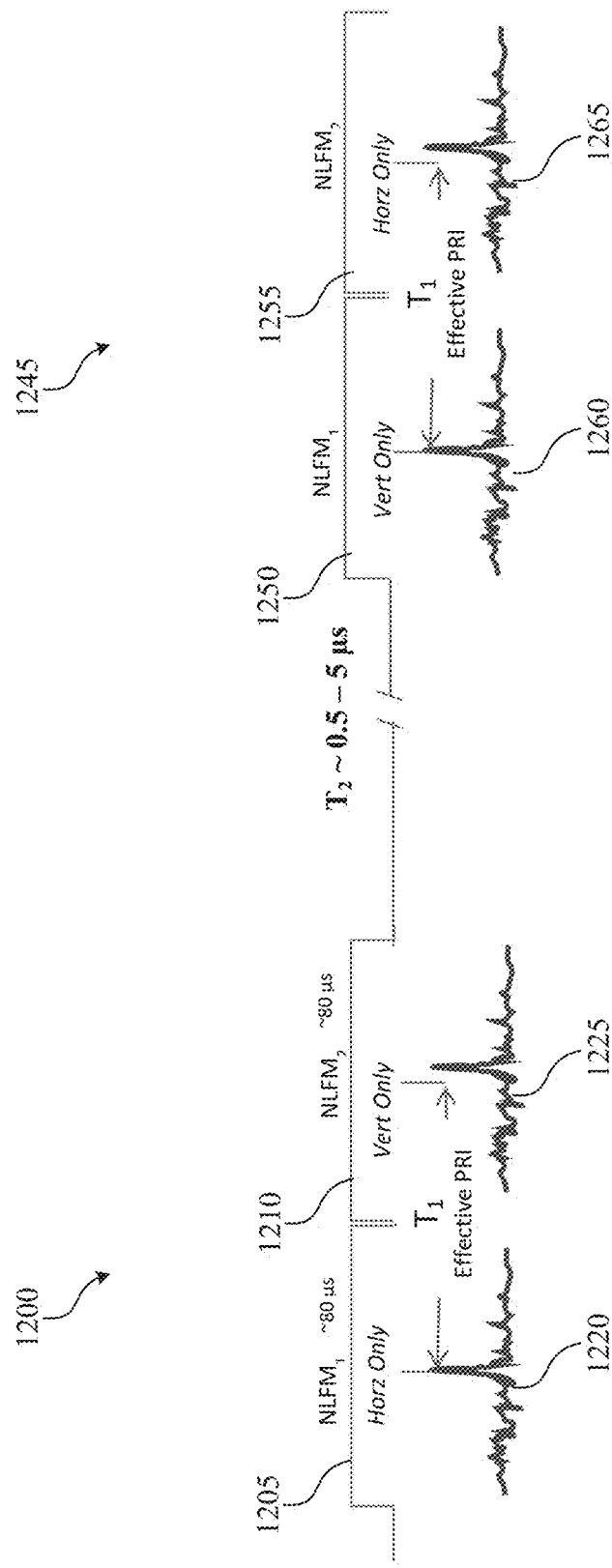
FIG. 12 shows a complex radar waveform according to some embodiments described in this document and/or the figures.

In some embodiments, the first waveform may be transmitted prior to transmitting the second waveform. In other embodiments, the second waveform may be transmitted prior to transmitting the first waveform. In yet other embodiments, the first waveform may be transmitted prior to transmitting the second waveform during a first complex pulse transmission and then the second waveform may be transmitted prior to transmitting the first waveform in a subsequent complex pulse transmission as shown in FIG. 12.

Figure 5B:
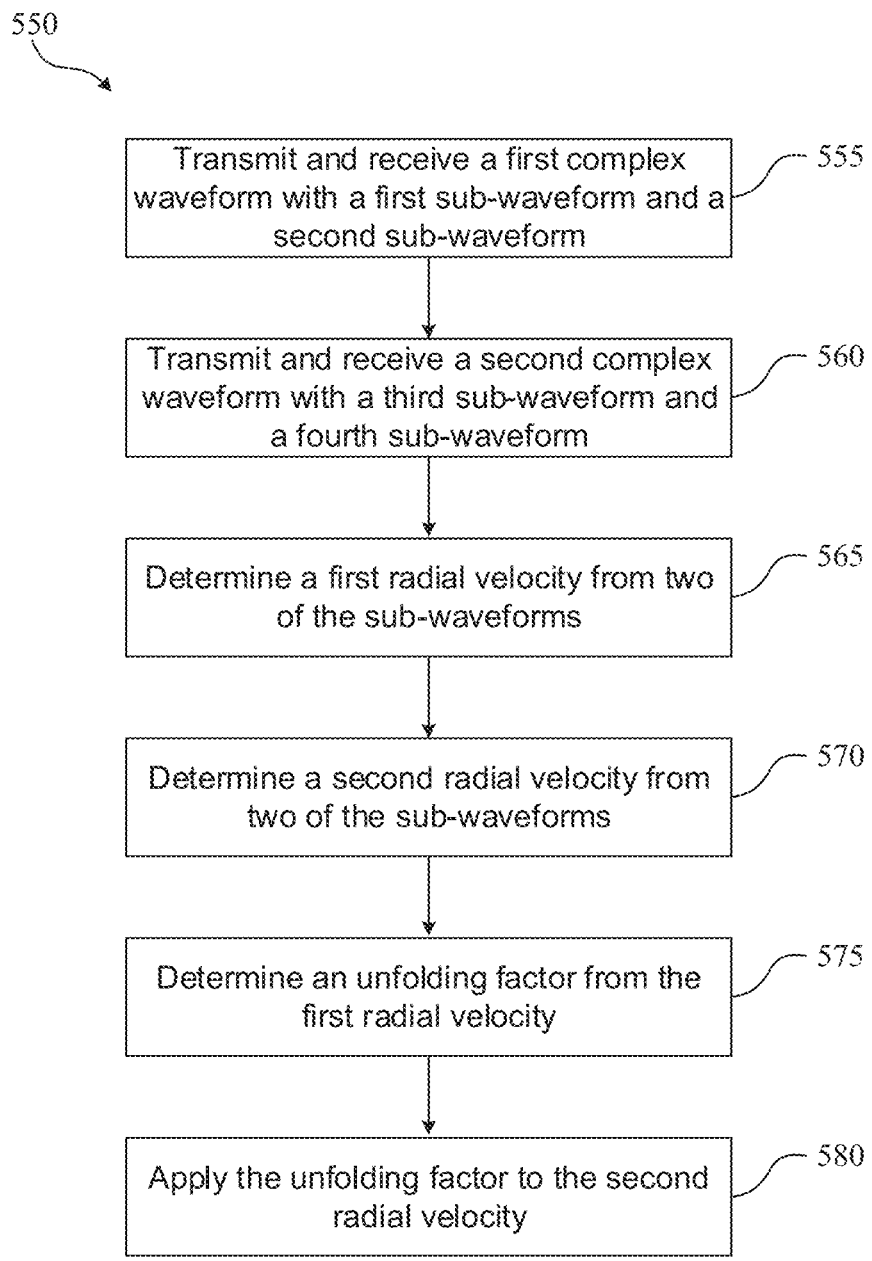
FIG. 5B is a flowchart of a method 550 for determining an unfolding factor for measuring radial velocity of an object or environmental phenomenon according to some embodiments.

FIG. 5B is a flowchart of a method 550 for determining an unfolding factor for measuring radial velocity of an object or environmental phenomenon according to some embodiments. One or more steps of the method 550 may be implemented, in some embodiments, by one or more components of radar system 300 of FIG. 3 or radar system 400 or of FIG. 4. Although illustrated as discrete blocks, various blocks may be divided into additional blocks, combined into fewer blocks, or eliminated, depending on the desired implementation.

Method 550 begins at block 555 where a first complex waveform may be transmitted with a first PRI. The first complex waveform may include a first sub-waveform and a second sub-waveform transmitted with a first PRF. In some embodiments, the first sub-waveform and the second sub-waveform may be orthogonally polarized relative to each other. Referring to FIG. 6, the first waveform 605 may be the first sub-waveform and the second waveform 610 may be the second waveform. In some embodiments, block 555 may include at least one or more of blocks 505, 510, 515, 520, and 525 of method 500 with a first PRI.

At block 560 a second complex waveform may be transmitted with a second PRI. The second complex waveform may include a third sub-waveform and a fourth sub-waveform transmitted with a second PRF that may or may not be equal with the first PRF. In some embodiments, the third-waveform and fourth sub-waveform may be orthogonally polarized relative to each other. In some embodiments, the third sub-waveform and the first sub-waveform and/or the second sub-waveform may be orthogonally polarized relative to each other. In some embodiments, the fourth sub-waveform and the first sub-waveform and/or the second sub-waveform may be orthogonally polarized relative to each other. Referring to FIG. 6, the first waveform 605 may be the third sub-waveform and the second waveform 610 may be the fourth waveform in a subsequent complex waveform following transmission of the first complex waveform. In some embodiments, block 555 may include at least one or more of blocks 505, 510, 515, 520, and 525 of method 500 with a first PRI.

At block 565 a first radial velocity may be determined from a received signal corresponding to any two of the first sub-waveform, the second sub-waveform, the third sub-waveform, and the fourth sub-waveform. For example, the first radial velocity may be determined from the first sub-waveform and the second sub-waveform of the first complex waveform using the first PRI. In some embodiments, the two waveforms used to determine the second radial velocity may be orthogonal relative to one another. In some embodiments, the block 565 may include portions of the disclosure discussed above in conjunction with blocks 530 and 535 of method 500. In some embodiments, the PRI between the two waveforms used to determine the second radial velocity may be used to determine.

At block 570 a second radial velocity may be determined from a received signal corresponding to any two of the first sub-waveform, the second sub-waveform, the third sub-waveform, and the fourth sub-waveform. For example, the second radial velocity may be determined from the third sub-waveform and the second sub-waveform of the first complex waveform using the first PRI. In some embodiments, the two waveforms used to determine the second radial velocity may be orthogonal relative to one another. In some embodiments, the block 575 may include portions of the disclosure discussed above in conjunction with blocks 530 and 535 of method 500. In some embodiments, the PRI between the two waveforms used to determine the second radial velocity may be used to determine.

At block 575 an unfolding factor may be determine from the first radial velocity by comparing the second radial velocity with the first radial velocity. For example, the first radial velocity estimate may be derived from a pair of pulses within the complex waveform (e.g., the first sub-waveform and the second sub-waveform) having a maximum unambiguous velocity which exceeds naturally occurring atmospheric phenomena. The second radial velocity estimate may be determined from a pair of pulses within the complex waveform (e.g., the second sub-waveform and the third sub-waveform). In some embodiments, the second radial velocity may be folded when the phase shift between pulses may exceed the Nyquist interval one or more times and/or when the naturally occurring velocity in the atmosphere exceeds the maximum unambiguous velocity of the second radial velocity. An unfolding factor of 2x, 3x, 4x, or Nx may applied to the second radial velocity estimate so that the final value of the second radial velocity estimate is near the value of the first radial velocity estimate.

In some embodiments, the first PRF may be different than the second PRF. In some embodiments, the first PRF may be a factor of the second PRF. The factor may, for example, be 3/2, 2/3, 4/5, 5/4, 3/4, 4/3, etc.

At block 580 the unfolding factor may be applied to the second radial velocity. For example, if the unfolding factor is determined to be 3/4, then the second radial velocity may be multiplied by 3/4.

Figure 7:
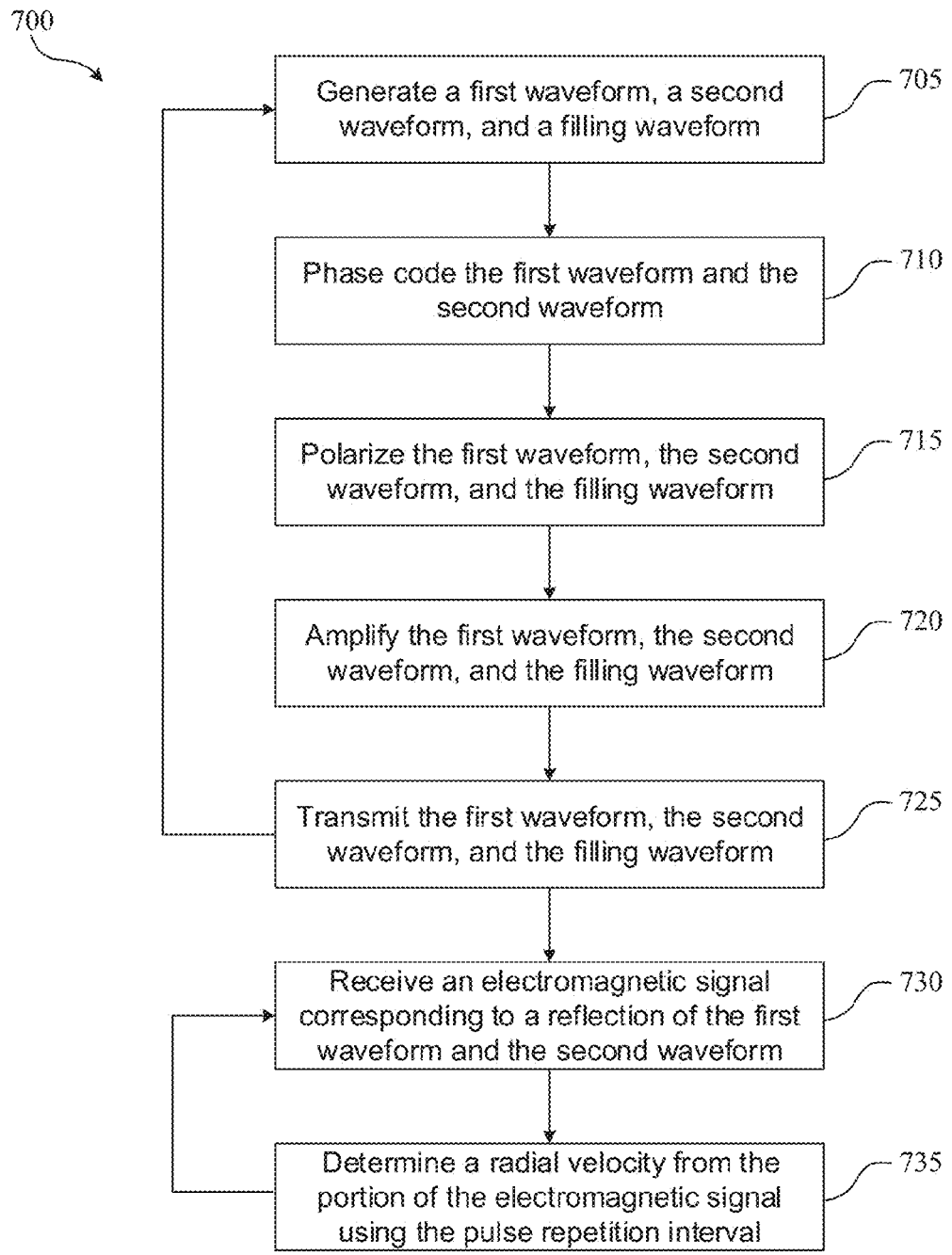
FIG. 7 is a flowchart of a method for measuring environmental objects with a complex radar waveform according to some embodiments described in this document and/or the figures.

FIG. 7 is a flowchart of a method 700 for measuring environmental objects with a complex radar waveform. One or more steps of the method 700 may be implemented, in some embodiments, by one or more components of radar system 300 of FIG. 3 or radar system 400 or FIG. 4. Although illustrated as discrete blocks, various blocks may be divided into additional blocks, combined into fewer blocks, or eliminated, depending on the desired implementation.

Method 700 may include a transmit sub-method comprising blocks 705, 710, 715, 720, and 725; and a receive sub-method comprising blocks 730, 735, and 740.

Method 700 may begin at block 705 where a first waveform, a second waveform, and a filling pulse are generated. The first waveform may be centered around a first frequency and the second waveform may also be centered around the first frequency. The first waveform and the second waveform may include any shape and/or frequency. In some embodiments, the first waveform and the second waveform may be generated using the waveform generator 305 of FIG. 3 and/or FIG. 4.

The filling waveform maybe centered around a second frequency that is different than the first frequency. In some embodiments, the filling waveform may have a frequency that is offset from the first frequency. In some embodiments, the filling waveform may allow for the collection of data regarding environmental phenomena in the area near the radar.

In some embodiments the first waveform and the second waveform may have a pulse length of less than, for example, 500 µs, 200 µs, 100 µs, 75 µs, 50 µs, 25 µs, etc. In some embodiments the first waveform and the second waveform may have a pulse length between 10 µs and 200 µs. In some specific embodiments the first waveform and the second waveform may have a pulse length of less than 20 µs or less than 5 µs, etc.

At block 710 the first waveform may be encoded with a first phase coding and the second waveform may be encoded with a second phase coding. In some embodiments, the first phase coding and the second phase coding may be different. In some embodiments, the first phase coding and/or the second phase coding may include modulation coding such as, for example, frequency modulation, phase modulation, non-linear frequency modulation, Costas code, linear frequency modulation, phase-coded pulse compression, etc. In some embodiments, the first phase coding and the second phase coding may have different coding techniques, coding parameters, amplitudes, phases, frequencies, etc. In some embodiments, the first waveform may be encoded with the first phase coding using the waveform generator 305 of FIG. 3 and/or FIG. 4 and the second waveform may be encoded with the second phase coding using the waveform generator 305 of FIG. 3 and/or FIG. 4.

In some embodiments, the filling waveform may be encoded with a third phase coding. The third phase coding, for example, may include modulation coding such as, for example, frequency modulation, phase modulation, non-linear frequency modulation, Costas code, linear frequency modulation, phase-coded pulse compression, etc. The filling waveform may be coded with the third phase coding using the waveform generator 305 of FIG. 3 and/or FIG. 4.

At block 715 the first waveform may be polarized with a first polarization state and the second waveform may be polarized with a second polarization state. In some embodiments, the first polarization state and the second polarization state may be orthogonal such as, for example, the first polarization state may be horizontal and the second polarization state may be vertical or vice versa. As another example, the first polarization state may be circular and the second polarization state may be orthogonal. In some embodiments, the first waveform may be polarized with the polarizer 310 shown in FIGS. 3 and 4, the second waveform may be polarized with the polarizer 310 shown in FIGS. 3 and 4, and the filling waveform may be polarized with the polarizer 310 shown in FIGS. 3 and 4.

In some embodiments, the filling waveform maybe polarized with a horizontal polarization state, a vertical polarization state, and/or a circular polarization state. In some embodiments, the filling waveform may be polarized with a simultaneous combination of at least two of a horizontal polarization state, a vertical polarization state; and/or a circular polarization state. In some embodiments, the filling waveform may be combination of a first pulse with a first polarization state and a second pulse with a second polarization state, where the first polarization state and the second polarization are different or orthogonal. The first polarization state may include a horizontal polarization state, a vertical polarization state; or a circular polarization state. The second polarization state may include a horizontal polarization state, a vertical polarization state; or a circular polarization state.

At block 720 the first polarized waveform, the second polarized waveform, and the filling waveform may be amplified. In some embodiments, the first polarized waveform may be amplified with a first amplifier (e.g., vertical amplifier 330 shown in FIG. 3) and the second polarized waveform may be amplified with a second amplifier (e.g., horizontal amplifier 320 shown in FIG. 3). In some embodiments, the filling waveform may be amplified using either or both the first amplifier and the second amplifier.

At block 725 the first waveform, the second waveform, and the filling waveform are transmitted into an environmental region using an antenna such as, for example, the antenna 345. In some embodiments, the first waveform may be sent prior to the second waveform. In some embodiments, the second waveform may be sent prior to the first waveform. In some embodiments, the time between transmission of the first waveform and the second waveform may be less than 20 nanoseconds. In some embodiments, the first waveform and the second waveform in combination may be considered a complex waveform.

In some embodiments, the filling waveform may be sent after the first waveform and the second waveform have been transmitted. In some embodiments, the filling waveform may be transmitted less than 500 µs, 200 µs, or 100 µs after either or both the first waveform and the second waveform have been sent. In some embodiments, the filling waveform may be transmitted between 10 µs and 20 µs after either or both the first waveform and the second waveform have been sent. In some embodiments, the filling waveform may be transmitted less 50 µs or 20 µs nanoseconds after either or both the first waveform and the second waveform have been sent.

Figure 8:
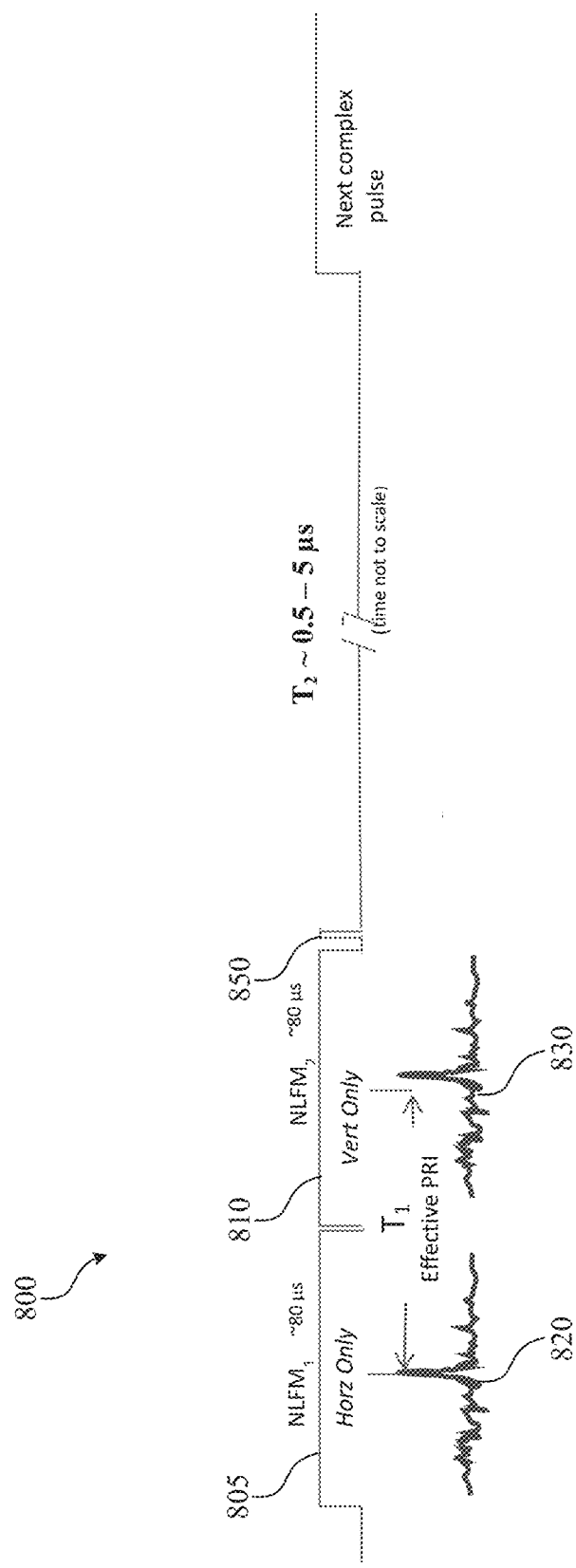
FIG. 8 shows a complex radar waveform according to some embodiments described in this document and/or the figures.

FIG. 8 shows an example of a complex radar waveform 800. The complex waveform 800 includes the first waveform 805, the second waveform 810, and the filling waveform 850. In this example, the first waveform 805 is a horizontally polarized waveform with nonlinear frequency modulation, the second waveform 810 is a vertically polarized waveform with nonlinear frequency modulation that is different than the nonlinear frequency modulation of the first waveform 805, and the filling waveform 850 simultaneously includes both horizontally and vertically polarized waveforms.

Returning to FIG. 7 and method 700, after block 725 the method 700 may return to block 705. Process 700 may wait a period of time after transmission of the first waveform and transmission of the second waveform before another transmission is made. In some embodiments, the period of time may be more than 1 ms, 10 ms, 50 ms, etc.

Additionally or alternatively, method 700 may proceed to block 730 where scattered and/or reflected electromagnetic radiation is received from the antenna. The electromagnetic radiation may correspond with the transmitted first wave and the transmitted second waveform reflected from an object (or a weather feature) in the environmental space.

Various signal processing techniques may be used to process the signal. For example, pulse compression techniques may be used to process the received signal. In some embodiments, the horizontal polarization state of the received signal and the vertical polarization state of the received signal may be processed separately to produce a horizontally polarized pulse compression signal and a vertically polarized pulse compression signal. In some embodiments, the received electromagnetic signal may be filtered and/or amplified.

FIG. 8 also illustrates examples of a horizontally polarized pulse compression signal 820 and a vertically polarized pulse compression signal 830. The horizontally polarized pulse compression signal 820 may have a central peak and the vertically polarized pulse compression signal 830 may also have a central peak. The time distance between these two peaks is the effective pulse repetition interval of the complex waveform 800. In some embodiments, the effective pulse repetition interval may depend on the amount of compression applied to the pulses in block 710 of method 700 and/or the amount of time between transmissions of the two pulses. In some embodiments, the effective pulse repetition interval may be on the order of the pulse width of the pulses transmitted in block 725.

Returning to FIG. 7, the method 700 may proceed to block 735 where a first radial velocity of an object or an atmospheric phenomenon in the environmental space is determined using the portion of the electromagnetic signal corresponding with the first waveform reflected from the object or the atmospheric phenomenon. In some embodiments, the radial velocity determination may not be coupled via or limited to the Doppler Dilemma. In some embodiments, the first radial velocity determination may be determined based on a function comprising the effective pulse repetition interval.

In some embodiments, the first radial velocity may be determined from a function of the effective pulse repetition interval such as, for example, $$v = \frac{\lambda}{4PRI}.$$

After block 735, the method 700 may then return to block 530 and receive another electromagnetic signal. In some embodiments, block 730 may be continuously receiving electromagnetic signals from the environmental space.

In some embodiments, the first waveform may be transmitted prior to transmitting the second waveform. In other embodiments, the second waveform may be transmitted prior to transmitting the first waveform. In yet other embodiments, the first waveform may be transmitted prior to transmitting the second waveform during a first complex pulse transmission and then the second waveform may be transmitted prior to transmitting the first waveform in a subsequent complex pulse transmission as shown in FIG. 12.

In some embodiments, the method 700 may be used in conjunction with method 550. For example, block 555 may include at least one or more of blocks 705, 710, 715, 720, and 725 of method 700 with a first PRI; the block 560 may include at least one or more of the blocks 730 and 735 of method 700; the block 565 may include at least one or more of blocks 705, 710, 715, 720, and 725 of method 700 with a second PRI; the block 570 may include at least one or more of blocks 730 and 735 of method 700.

Figure 9:
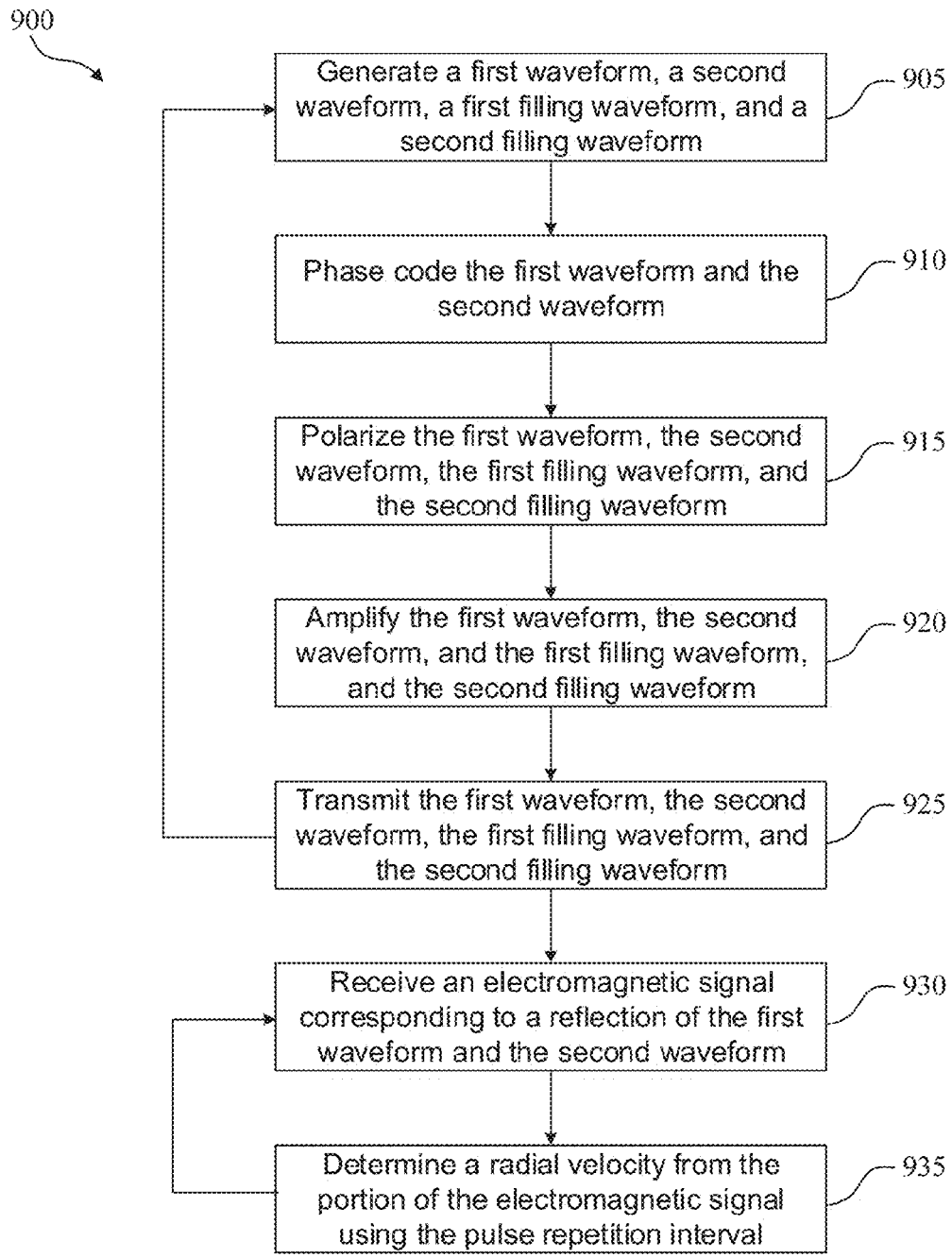
FIG. 9 is a flowchart of a method for measuring environmental objects with a complex radar waveform according to some embodiments described in this document and/or the figures.

FIG. 9 is a flowchart of a method 900 for measuring environmental objects with a complex radar waveform. One or more steps of the method 900 may be implemented, in some embodiments, by one or more components of radar system 300 of FIG. 3 or radar system 400 or FIG. 4. Although illustrated as discrete blocks, various blocks may be divided into additional blocks, combined into fewer blocks, or eliminated, depending on the desired implementation.

Method 900 may include a transmit sub-method comprising blocks 905, 910, 915, 920, and 925; and a receive sub-method comprising blocks 930, 935, and 940.

Method 900 may begin at block 905 where a first, a second waveform, a first filling waveform, and a second filling waveform are generated. The first waveform may be centered around a first frequency and the second waveform may also be centered around the first frequency. The first waveform and the second waveform may include any shape and/or frequency. In some embodiments, the first waveform and the second waveform may be generated using the waveform generator 305 of FIG. 3 and/or FIG. 4.

In some embodiments, the first filling waveform and the second filling waveform may be centered around a second frequency that is different than the first frequency. In some embodiments, the first filling waveform may be centered around a second frequency that is different than the first frequency and the second filling waveform may be centered around a third frequency that is different than the first frequency and the second frequency. In some embodiments, the second frequency and/or the third frequency may have a frequency that is offset from the first frequency. In some embodiments, the first filling waveform and the second filling waveform may allow for the collection of data regarding environmental phenomena in the area near the radar.

In some embodiments the first waveform and the second waveform may have a pulse length of less than 100 μs. In some embodiments, the filling waveform may have a pulse length of less than 20 μs, 10 μs, or 5 μs.

At block 910 the first waveform may be encoded with a first phase coding and the second waveform may be encoded with a second phase encoding. In some embodiments, the first phase coding and the second phase coding may be different. In some embodiments, the first phase coding and/or the second phase coding may include modulation coding such as, for example, frequency modulation, phase modulation, non-linear frequency modulation, Costas code, linear frequency modulation, phase-coded pulse compression, etc. In some embodiments, the first phase coding and the second phase coding may have different coding techniques, coding parameters, amplitudes, phases, frequencies, etc. In some embodiments, the first waveform may be encoded with the first phase coding using the waveform generator 305 of FIG. 3 and/or FIG. 4 and the second waveform may be encoded with the second phase coding using the waveform generator 305 of FIG. 3 and/or FIG. 4.

In some embodiments, the filling waveform may be encoded with a third phase coding. The third phase coding, for example, may include modulation coding such as, for example, frequency modulation, phase modulation, non-linear frequency modulation, Costas code, linear frequency modulation, phase-coded pulse compression, etc. The filling waveform may be coded with the third phase coding using the waveform generator 305 of FIG. 3 and/or FIG. 4.

At block 915 the first waveform may be polarized with a first polarization state and the second waveform may be polarized with a second polarization state. In some embodiments, the first polarization state and the second polarization state may be orthogonal such as, for example, the first polarization state may be horizontal and the second polarization state may be vertical or vice versa. As another example, the first polarization state may be circular and the second polarization state may be orthogonal. In some embodiments, the first waveform may be polarized with the polarizer 310 shown in FIGS. 3 and 4, the second waveform may be polarized with the polarizer 310 shown in FIGS. 3 and 4, and the filling waveform may be polarized with the polarizer 310 shown in FIGS. 3 and 4.

In some embodiments, the first filling waveform may be polarized with a third polarization state and the second filling waveform may be polarized with a fourth polarization state that is different than and/or orthogonal from the third polarization state. In some embodiments, the third polarization state may include a horizontal polarization state, a vertical polarization state, and/or a circular polarization state. In some embodiments, the fourth polarization state may include a horizontal polarization state, a vertical polarization state, and/or a circular polarization state. In some embodiments, the third polarization state may include horizontal polarization and the fourth polarization state may include a vertical polarization state or vice versa.

At block 920 the first polarized waveform, the second polarized waveform, the first filling waveform, and the second filling waveform may be amplified. In some embodiments, the first polarized waveform may be amplified with a first amplifier (e.g., vertical amplifier 330 shown in FIG. 3) and the second polarized waveform may be amplified with a second amplifier (e.g., horizontal amplifier 320 shown in FIG. 3).

In some embodiments, the first filling waveform may be amplified with a first amplifier (e.g., vertical amplifier 330 shown in FIG. 3) and the second filling waveform may be amplified with a second amplifier (e.g., horizontal amplifier 320 shown in FIG. 3).

At block 925 the first waveform, the second waveform, the first filling waveform, and the second filling waveform are transmitted into an environmental region using an antenna such as, for example, the antenna 345. In some embodiments, the first waveform may be sent prior to the second waveform. In some embodiments, the second waveform may be sent prior to the first waveform. In some embodiments, the time between transmission of the first waveform and the second waveform may be less than 20 nanoseconds. In some embodiments, the first waveform and the second waveform in combination may be considered a complex waveform.

In some embodiments, the filling waveform may be sent after the first waveform and the second waveform have been transmitted. In some embodiments, the filling waveform may be transmitted 20 nanoseconds after either or both the first waveform and the second waveform have been sent. In some embodiments, the first filling waveform may be transmitted prior to transmitting the second filling waveform. In some embodiments, the second filling waveform may be transmitted prior to transmitting the first filling waveform.

Figure 10:
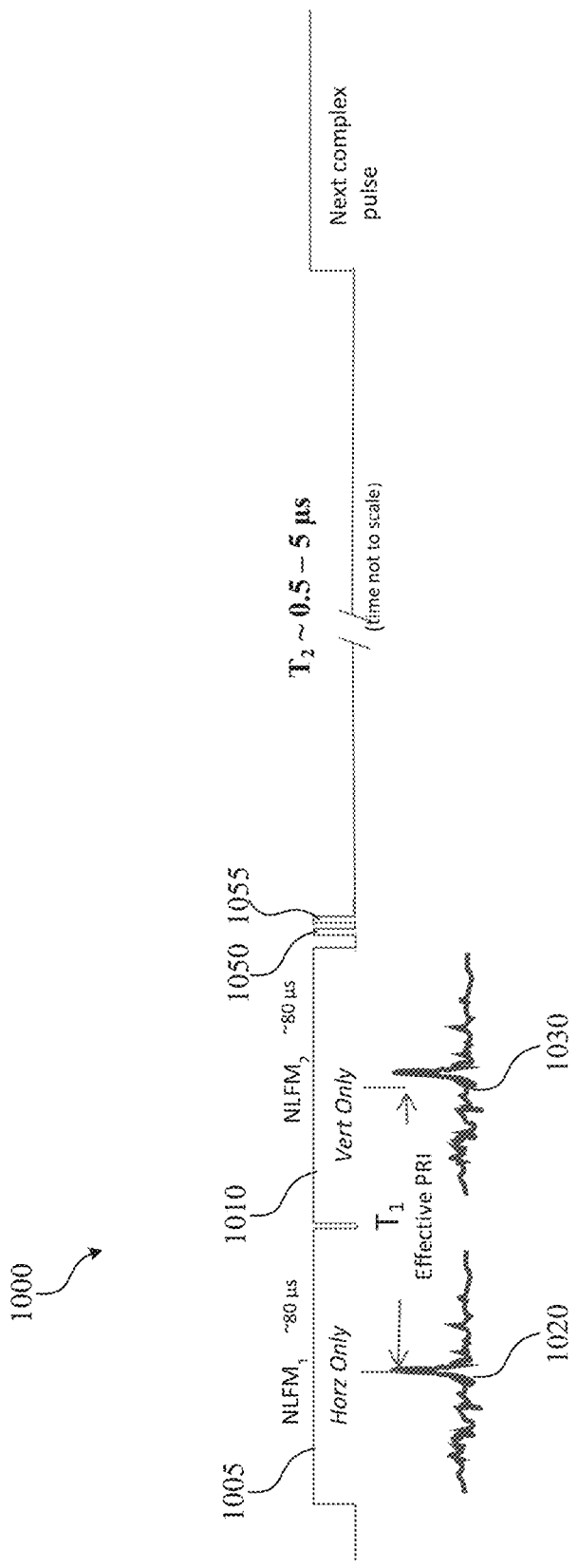
FIG. 10 shows a complex radar waveform according to some embodiments described in this document and/or the figures.

FIG. 10 shows an example of a complex radar waveform 1000. The complex waveform 1000 includes the first waveform 1005, the second waveform 1010, the first filling waveform 1050, and the second filling waveform 1055. In this example, the first waveform 1005 is a horizontally polarized waveform with nonlinear frequency modulation, the second waveform 1010 is a vertically polarized waveform with nonlinear frequency modulation that is different than the nonlinear frequency modulation of the first waveform 1005, the filling waveform 1050 is horizontally polarized, and the second filling waveform 1055 is vertically polarized.

Returning to FIG. 9 and method 900, after block 925 the method 900 may return to block 905. Process 900 may wait a period of time after transmission of the first waveform and transmission of the second waveform before another transmission is made. In some embodiments, the period of time may be more than 1 ms, 10 ms, 50 ms, etc.

Additionally or alternatively, method 900 may proceed to block 930 where scattered and/or reflected electromagnetic radiation is received from the antenna. The electromagnetic radiation may correspond with the transmitted first wave and the transmitted second waveform reflected from an object (or a weather feature) in the environmental space.

Various signal processing techniques may be used to process the signal. For example, pulse compression techniques may be used to process the received signal. In some embodiments, the horizontal polarization state of the received signal and the vertical polarization state of the received signal may be processed separately to produce a horizontally polarized pulse compression signal and a vertically polarized pulse compression signal. In some embodiments, the received electromagnetic signal may be filtered and/or amplified.

FIG. 10 also illustrates examples of a horizontally polarized pulse compression signal 1020 and a vertically polarized pulse compression signal 1030. The horizontally polarized pulse compression signal 1020 may have a central peak and the vertically polarized pulse compression signal 1030 may also have a central peak. The time distance between these two peaks is the effective pulse repetition interval of the complex waveform 1000. In some embodiments, the effective pulse repetition interval may depend on the amount of compression applied to the pulses in block 910 of method 900 and/or the amount of time between transmissions of the two pulses. In some embodiments, the effective pulse repetition interval may be on the order of the pulse width of the pulses transmitted in block 925.

Returning to FIG. 9, the method 900 may proceed to block 935 where a first radial velocity of an object or an atmospheric phenomenon in the environmental space is determined using the portion of the electromagnetic signal corresponding with the first waveform reflected from the object or the atmospheric phenomenon. In some embodiments, the radial velocity determination may not be coupled via or limited to the Doppler Dilemma. In some embodiments, the first radial velocity determination may be determined based on a function comprising the effective pulse repetition interval.

In some embodiments, the first radial velocity may be determined from a function of the effective pulse repetition interval such as, for example, $$v = \frac{\lambda}{4PRI}.$$

After block 935, the method 900 may then return to block 930 and receive another electromagnetic signal. In some embodiments, block 930 may be continuously receiving electromagnetic signals from the environmental space.

In some embodiments, the first waveform may be transmitted prior to transmitting the second waveform. In other embodiments, the second waveform may be transmitted prior to transmitting the first waveform. In yet other embodiments, the first waveform may be transmitted prior to transmitting the second waveform during a first complex pulse transmission and then the second waveform may be transmitted prior to transmitting the first waveform in a subsequent complex pulse transmission as shown in FIG. 12.

In some embodiments, the method 900 may be used in conjunction with method 550. For example, the block 555 may include at least one or more of blocks 905, 910, 915, 920, and 925 of method 900 with a first PRI; the block 560 may include at least one or more of the blocks 930 and 935 of method 900; the block 565 may include at least one or more of blocks 905, 910, 915, 920, and 925 of method 900 with a second PRI; the block 570 may include at least one or more of blocks 930 and 935 of method 900.

Figure 11:
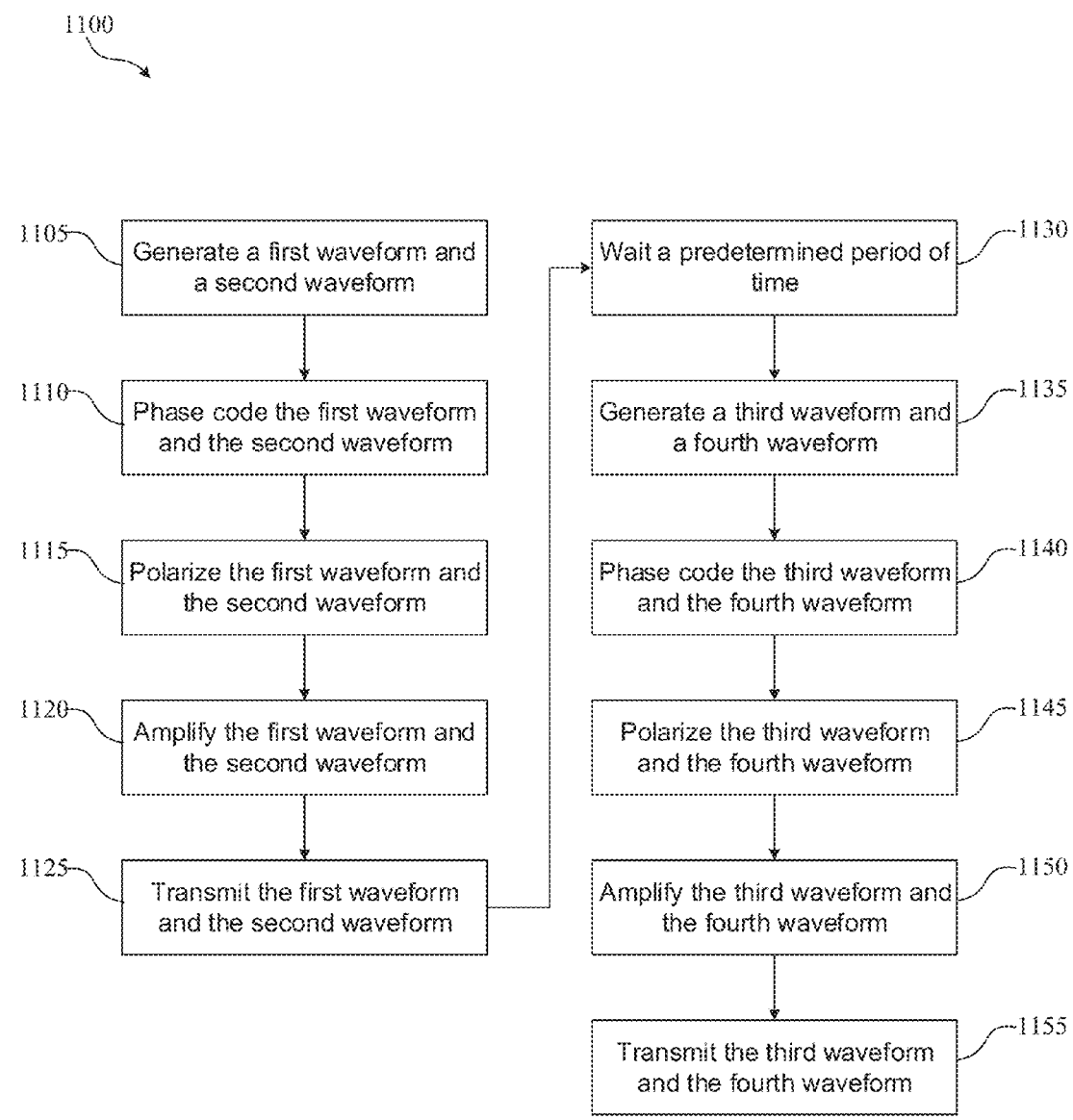
FIG. 11 is a flowchart of a method for measuring environmental objects with a complex radar waveform according to some embodiments described in this document and/or the figures.

FIG. 11 is a flowchart of a method 1100 for measuring environmental objects with a complex radar waveform. One or more steps of the method 1100 may be implemented, in some embodiments, by one or more components of radar system 300 of FIG. 3 or radar system 400 or of FIG. 4. Although illustrated as discrete blocks, various blocks may be divided into additional blocks, combined into fewer blocks, or eliminated, depending on the desired implementation. The method 1100 may include a first transmit sub-method comprising blocks 1105, 1110, 1115, 1120, and 1125; and a second transmit sub-method comprising blocks 1130, 1135, 1140, 1145, 1150, and 1155.

The method 1100 may begin at block 1105 where a first waveform and a second waveform are generated. The first waveform may be centered around a first frequency and the second waveform may also be centered around the first frequency. The first waveform and the second waveform may include any shape and/or frequency. In some embodiments, the first waveform may be generated and the second waveform may be generated using the waveform generator 305 of FIG. 3 and/or FIG. 4.

In some embodiments the first waveform and the second waveform may have a pulse length of less than 100 µs.

At block 1110 the first waveform may be encoded with a first phase coding and the second waveform may be encoded with a second phase encoding. In some embodiments, the first phase coding and the second phase coding may be different. In some embodiments, the first phase coding and/or the second phase coding may include modulation such as, for example, frequency modulation, phase modulation, non-linear frequency modulation, Costas code, linear frequency modulation, phase-coded pulse compression, etc. In some embodiments, the first phase coding and the second phase coding may have different coding techniques, coding parameters, amplitudes, phases, frequencies, etc. In some embodiments, the first waveform may be encoded with the first phase coding and the second waveform may be encoded with the second phase coding using the waveform generator 305 of FIG. 3 and/or FIG. 4.

At block 1115 the first waveform may be polarized with a first polarization state and the second waveform may be polarized with a second polarization state. In some embodiments, the first polarization state and the second polarization state may be orthogonal such as, for example, the first polarization state may be horizontal and the second polarization state may be vertical or vice versa. As another example, the first polarization state may be circular and the second polarization state may be orthogonal. In some embodiments, the first waveform may be polarized and the second waveform may be polarized with the polarizer 310 shown in FIGS. 3 and 4.

At block 1120 the first polarized waveform and the second polarized waveform may be amplified. In some embodiments, the first polarized waveform may be amplified with a first amplifier (e.g., vertical amplifier 330 shown in FIG. 30 and the second polarized waveform may be amplified with a second amplifier (e.g., horizontal amplifier 320 shown in FIG. 3).

At block 1125 the first waveform and the second waveform are transmitted into an environmental region using an antenna such as, for example, the antenna 345. In some embodiments, the first waveform may be sent prior to the second waveform. In some embodiments, the first waveform and the second waveform in combination may be considered a complex waveform.

At block 1130 the method 1100 may wait a predetermined period of time. The predetermined period of time may be more than 1 ms, 10 ms, 110 ms, etc.

At block 1135 a third waveform and a fourth waveform are generated. The third waveform may be centered around the first frequency and the fourth waveform may be centered around the first frequency. The third waveform and the fourth waveform may include any shape and/or frequency. In some embodiments, the third waveform and the fourth waveform may be generated using the waveform generator 305 of FIG. 3 and/or FIG. 4.

In some embodiments the third waveform and the fourth waveform may have a pulse length of less than 100 µs.

At block 1140 the third waveform may be encoded with a third phase coding and the fourth waveform may be encoded with a fourth phase coding. In some embodiments, the third phase coding and the fourth phase coding may be different. In some embodiments, the third phase coding and/or the fourth phase coding may include modulation such as, for example, frequency modulation, phase modulation, non-linear frequency modulation, Costas code, linear frequency modulation, phase-coded pulse compression, etc. In some embodiments, the third phase coding and the fourth phase coding may have different coding techniques, coding parameters, amplitudes, phases, frequencies, etc. In some embodiments, the third waveform may be encoded with the third phase coding and the fourth waveform may be encoded with the fourth phase coding using the waveform generator 305 of FIG. 3 and/or FIG. 4.

At block 1145 the third waveform may be polarized with the second polarization state and the fourth waveform may be polarized with the first polarization state. In some embodiments, the third waveform may be polarized and the fourth waveform may be polarized with the polarizer 310 shown in FIGS. 3 and 4.

At block 1150 the third waveform and the fourth waveform may be amplified. In some embodiments, third polarized waveform may be amplified with a first amplifier (e.g., vertical amplifier 330 shown in FIG. 3) and the fourth waveform may be amplified with a second amplifier (e.g., horizontal amplifier 320 shown in FIG. 3).

At block 1155 the third waveform and the fourth waveform are transmitted into an environmental region using the antenna (e.g., the antenna 345). In some embodiments, the third waveform may be sent prior to the fourth waveform. In some embodiments, the third waveform and the fourth waveform in combination may be considered a complex waveform.

After block 1155, method 1100 may return to block 1105.

In some embodiments, the method 1100 may also generate and/or transmit one or more filling waveforms after transmission of the second waveform and/or transmission of the fourth waveform.

FIG. 12 shows an example of a first complex radar waveform 1200 and a second complex waveform 1245. The complex waveform 1200 includes a first waveform 1205 and a second waveform 1210. The complex waveform 1245 includes the third waveform 1250 and the fourth waveform 1255. In this example, the first waveform 1205 and the third waveform 1250 are horizontally polarized waveforms and the second waveform 1210 and the fourth waveform 1255 are vertically polarized waveforms.

FIG. 12 also illustrates examples of a first polarized pulse compression signal 1220 a second polarized pulse compression signal 1225, a third polarized pulse compression signal 1260, and a third polarized pulse compression signal 1265. The first polarized pulse compression signal 1220 and the fourth polarized pulse compression signal 1265 may be horizontally polarized; and the second polarized pulse compression signal 1225 and the third polarized pulse compression signal 1265 may vertically polarized, or vice versa. The first polarized pulse compression signal 1220 may have a central peak and the second polarized pulse compression signal 1225 may also have a central peak. The time distance between these two peaks is the effective pulse repetition interval of the first complex waveform 1200. The third polarized pulse compression signal 1260 may have a central peak and the fourth polarized pulse compression signal 1265 may also have a central peak. The time distance between these two peaks is the effective pulse repetition interval of the second complex waveform 1245.

In some embodiments, the effective pulse repetition interval may depend on the amount of compression applied to the pulses in block 1110 of method 1100 and/or the amount of time between transmissions of the two pulses. In some embodiments, the effective pulse repetition interval may be on the order of the pulse width of the pulses transmitted in block 1125 and/or 1155.

Some embodiments may use alternating or modulating polarization states with pulse compression techniques. The effective sub-pulse repetition interval between two successive compressed pulses may be dependent on the amount of compression applied to the pulse. For example, using pulse compression techniques, an 80 µs pulse which is 12 km in length can be compressed to a range resolution of 150 meters or better. Thus, the 80 µs transmitted pulse may be compressed to an equivalent of 1 µs in width. In some embodiments, the effective pulse repetition interval may be the difference between the transmitted pulse width and the compressed pulse width, which, in this example, may be 79 µs plus whatever time we allow in between the two sub-pulses. Using the effective pulse repetition interval into the maximum unambiguous velocity equation as the PRF may allow for unambiguous radial velocity measurements. For example, a conventional C-band system using nonlinear frequency modulation pulse compression may be able to a measure radial velocity of about 13.5 m/s (assuming a PRF of 1,000). Using embodiments described herein, however, a C-band system using nonlinear frequency modulation pulse compression may be able to a measure radial velocity of about 168.8 m/s.

Figure 13:
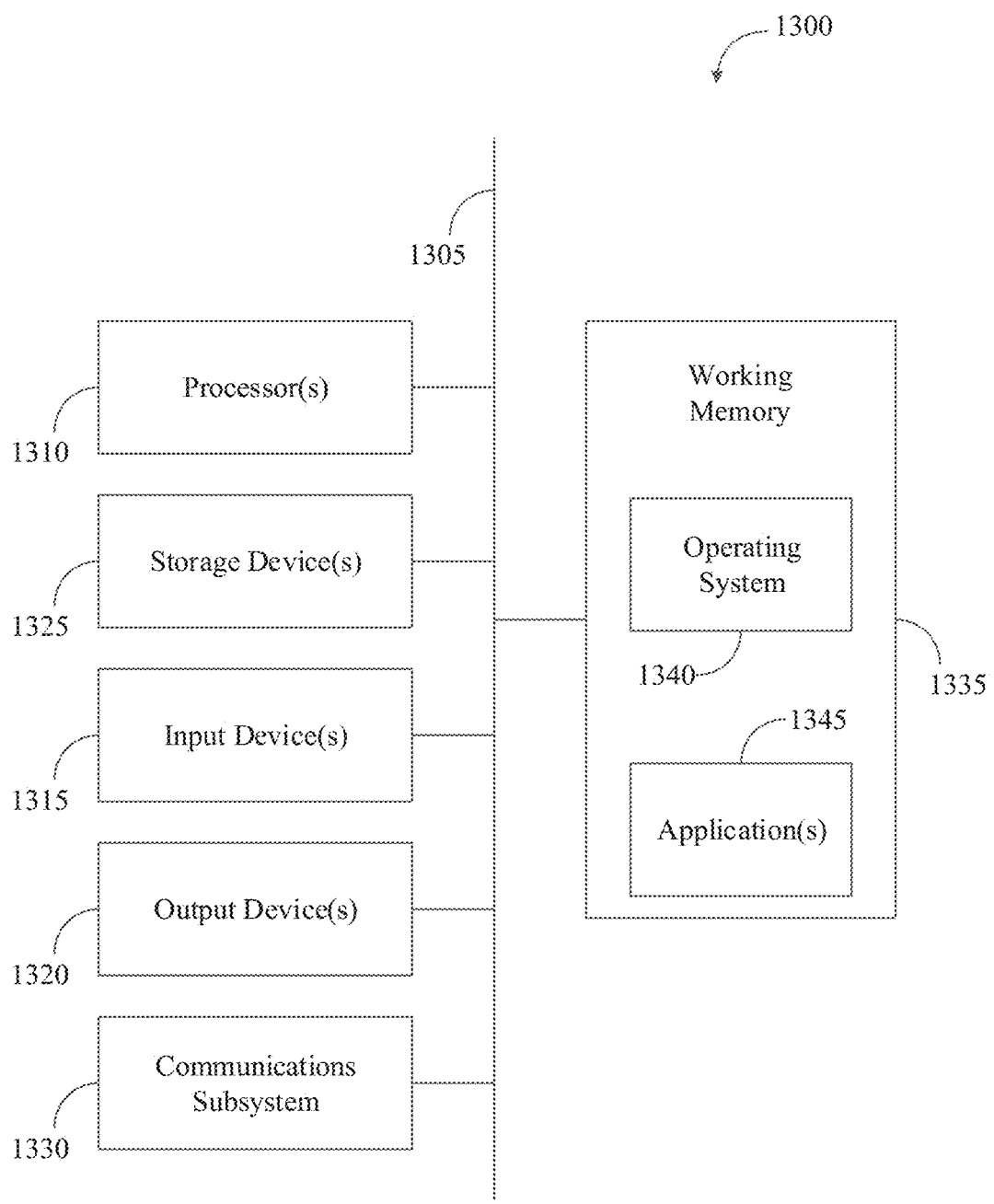
FIG. 13 shows an illustrative computational system for performing functionality to facilitate implementation of embodiments described in this document and/or the figures.

The computational system 1300 (or processing unit) illustrated in FIG. 13 can be used to perform and/or control operation of any of the embodiments described in this document and/or the figures. For example, the computational system 1300 can be used alone or in conjunction with other components such as, for example, the wave generator 305 and/or the signal processor 365. As another example, the computational system 1300 can be used to perform any calculation, solve any equation, perform any identification, and/or make any determination described within this document.

The computational system 1300 may include any or all of the hardware elements shown in the figure and described in this document and/or the figures. The computational system 1300 may include hardware elements that can be electrically coupled via a bus 1305 (or may otherwise be in communication, as appropriate). The hardware elements can include one or more processors 1310, including, without limitation, one or more general-purpose processors and/or one or more special-purpose processors (such as digital signal processing chips, graphics acceleration chips, and/or the like); one or more input devices 1315, which can include, without limitation, a mouse, a keyboard, and/or the like; and one or more output devices 1320, which can include, without limitation, a display device, a printer, and/or the like.

The computational system 1300 may further include (and/or be in communication with) one or more storage devices 1325, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1300 might also include a communications subsystem 1330, which can include, without limitation, a modem, a network card (wireless or wired), an infrared communication device, a wireless communication device, and/or chipset (such as a Bluetooth® device, a 802.6 device, a WiFi device, a WiMAX device, cellular communication facilities, etc.), and/or the like. The communications subsystem 1330 may permit data to be exchanged with a network (such as the network described below, to name one example) and/or any other devices described in this document and/or the figures. In many embodiments, the computational system 1300 will further include a working memory 1335, which can include a RAM or ROM device, as described above.

The computational system 1300 also can include software elements, shown as being currently located within the working memory 1335, including an operating system 1340 and/or other code, such as one or more application programs 1345, which may include computer programs of the invention, and/or may be designed to implement methods of the invention and/or configure systems of the invention, as described in this document and/or the figures. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1325 described above.

In some cases, the storage medium might be incorporated within the computational system 1300 or in communication with the computational system 1300. In other embodiments, the storage medium might be separate from the computational system 1300 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1300 and/or might take the form of source and/or installable code, which, upon compilation and/or installation on the computational system 1300 (e.g., using any of a variety of generally available compilers, installation programs, compression/decompression utilities, etc.), then takes the form of executable code.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A weather radar system comprising:
a waveform generator configured to generate a first waveform centered around a first frequency and a second waveform centered around the first frequency;
a modulator configured to modulate the first waveform to include a first non-linear frequency modulation and modulate the second waveform to include a second non-linear frequency modulation;
one or more polarizers configured to polarize the first waveform to include a first polarization state and polarize the second waveform to include a second polarization state;
one or more amplifiers configured to amplify the first waveform and the second waveform;
a first transmitter is configured to transmit the first waveform as a first electromagnetic pulse into an environmental region;
a second transmitter is configured to transmit the second waveform as a second electromagnetic pulse into the environmental region, wherein the second electromagnetic pulse is transmitted within 100 nanoseconds of the completion of the transmission of the first electromagnetic pulse;
a receiver configured to receive an electromagnetic signal reflected from within the environmental region; and
a processor configured to processes the received electromagnetic signal using pulse compression techniques and determine a radial velocity an environmental object of interest within the environmental region based at least in part on the processed electromagnetic signal.

2. The weather radar system according to claim 1, wherein the one or more amplifiers comprise one or more solid state amplifiers.

3. The weather radar system according to claim 1, wherein the one or more amplifiers comprise a first solid state amplifier configured to amplify the first waveform and a second solid state amplifier configured to amplify the second waveform.

4. The weather radar system according to claim 1, wherein the received electromagnetic signal includes a first signal corresponding with the first waveform and a second signal corresponding with the second waveform, wherein the processor is further configured to determine the radial velocity using pulse pair processing.

5. The weather radar system according to claim 1, wherein the processor is configured to determine a radial velocity less than a maximum radial velocity, wherein the maximum radial velocity is determined from a function that is directly proportional to a wavelength of the received electromagnetic signal and inversely proportional to a pulse interval time of the received electromagnetic signal.

6. The weather radar system according to claim 1, wherein:
the waveform generator is configured to generate a third waveform centered around the first frequency and generate a fourth waveform centered around the first frequency;
the modulator is configured to modulate the third waveform to include a third non-linear frequency modulation and modulate the fourth waveform to include a fourth non-linear frequency modulation;
the one or more polarizers is configured to polarize the third waveform to include the first polarization state and polarize the fourth waveform to include the second polarization state;
the one or more amplifiers configured to amplify the third waveform and the fourth waveform;
the first transmitter is configured to transmit the third waveform as a third electromagnetic pulse into the environmental region, wherein the third waveform is transmitted into the environmental region a predetermined period of time after the second waveform has been transmitted into the environmental region;
the second transmitter is configured to transmit the fourth waveform as a fourth electromagnetic pulse into the environmental region, wherein the fourth electromagnetic pulse is transmitted within 100 nanoseconds of the completion of the transmission of the third electromagnetic pulse;
the receiver is configured to receive a second electromagnetic signal reflected from the environmental region; and
the processor is configured to process the second electromagnetic signal using pulse compression techniques, and determine a radial velocity and a range of an environmental object of interest within the environmental region based at least in part on the processed second electromagnetic signal.

7. The weather radar system according to claim 1, wherein:
the waveform generator is configured to generate a third waveform centered around the first frequency and generate a fourth waveform centered around the first frequency;
the modulator is configured to modulate the third waveform to include a third non-linear frequency modulation and modulate the fourth waveform to include a fourth non-linear frequency modulation;
the one or more polarizers is configured to polarize the third waveform to include the second polarization state and polarize the fourth waveform to include the first polarization state;
the one or more amplifiers configured to amplify the third waveform and the fourth waveform;
the first transmitter is configured to transmit the third waveform as a third electromagnetic pulse into the environmental region, wherein the third waveform is transmitted into the environmental region a predetermined period of time after the second waveform has been transmitted into the environmental region;
the second transmitter is configured to transmit the fourth waveform as a fourth electromagnetic pulse into the environmental region, wherein the fourth electromagnetic pulse is transmitted within 100 nanoseconds of the completion of the transmission of the third electromagnetic pulse;

the receiver is configured to receive a second electromagnetic signal reflected from the environmental region; and the processor is configured to processes the second electromagnetic signal using pulse compression techniques, and determine a radial velocity and a range of an environmental object of interest within the environmental region based at least in part on the processed second electromagnetic signal.

8. The weather radar system according to claim 1, wherein:
the waveform generator is configured to generate a filling waveform centered around a second frequency;
the one or more amplifiers configured to amplify the filling waveform; and
either or both the first transmitter and the second transmitter is configured to transmit the filling waveform as a third electromagnetic pulse into the environmental region, wherein the third waveform is transmitted into the environmental region a predetermined period of time after the second waveform has been transmitted into the environmental region.

9. The weather radar system according to claim 1, wherein:
the waveform generator is configured to generate a first filling waveform centered around a second frequency and a second filling waveform centered around the second frequency;
the one or more polarizers is configured to polarize the first filling waveform to include the first polarization state and polarize the second filling waveform to include the second polarization state;
the one or more amplifiers configured to amplify the first filling waveform and the second filling waveform;
the first transmitter is configured to transmit the first filling waveform as a third electromagnetic pulse into the environmental region, wherein the first filling waveform is transmitted into the environmental region a predetermined period of time after the second waveform has been transmitted into the environmental region; and
the second transmitter is configured to transmit the second filling waveform as a fourth electromagnetic pulse into the environmental region, wherein the second filling waveform is transmitted into the environmental space.

10. The weather radar system according to claim 1, wherein the received electromagnetic signal includes a first signal corresponding with the first waveform and a second signal corresponding with the second waveform, wherein the processor is further configured to determine an unfolding factor from the first signal and the second signal.

11. A method comprising:
generating a first waveform centered around a first frequency, having a first phase coding, and having a first polarization state;
generating a second waveform centered around the first frequency, having a second phase coding, and having a second polarization state, wherein the first polarization state and the second polarization state are orthogonal, and wherein the first phase coding and the second phase coding are different;
amplifying the first waveform and the second waveform;
transmitting the first waveform as a first electromagnetic pulse into an environmental region using a first transmitter;
transmitting the second waveform as a second electromagnetic pulse into the environmental region using a second transmitter, wherein the second electromagnetic pulse is transmitted within 100 nanoseconds of the completion of the transmission of the first electromagnetic pulse;
receiving a received electromagnetic signal reflected from the environmental region;
processing the received electromagnetic signal using pulse compression techniques; and
determining a radial velocity of an environmental object of interest within the environmental region based at least in part on the processed electromagnetic signal.

12. The method according to claim 11, wherein the received electromagnetic signal includes a first signal corresponding with the first waveform and a second signal corresponding with the second waveform, wherein determining the radial velocity includes determining the radial velocity using pulse pair processing.

13. The method according to claim 11, wherein generating the first waveform centered around a first frequency further comprises modulating the first waveform with the first phase coding comprising a non-linear frequency modulation; and
wherein generating the second waveform centered around a first frequency further comprises modulating the second waveform with the second phase coding comprising a non-linear frequency modulation.

14. The method according to claim 11, wherein a maximum radial velocity is determined from a function that is directly proportional to a wavelength of the received electromagnetic signal and inversely proportional to a pulse interval time of the received electromagnetic signal.

15. The method according to claim 11, further comprising:
waiting a predetermined period of time after transmitting the second electromagnetic pulse;
generating a third waveform centered around the first frequency, having a third phase coding, and having the first polarization state;
generating a fourth waveform centered around the first frequency, having a fourth phase coding, and having the second polarization state, wherein the third phase coding and the fourth phase coding are different;
amplifying the third waveform and the fourth waveform;
transmitting the third waveform as a third electromagnetic pulse into an environmental region using the first transmitter; and
transmitting the fourth waveform as a fourth electromagnetic pulse into the environmental region using the second transmitter, wherein the fourth electromagnetic pulse is transmitted within 100 nanoseconds of the completion of the transmission of the third electromagnetic pulse.

16. The method according to claim 11, further comprising:
waiting a predetermined period of time after transmitting the second electromagnetic pulse;
generating a third waveform centered around the first frequency, having a third phase coding, and having the second polarization state;
generating a fourth waveform centered around the first frequency, having a fourth phase coding, and having the first polarization state, wherein the third phase coding and the fourth phase coding are different;
amplifying the third waveform and the fourth waveform;
transmitting the third waveform as a third electromagnetic pulse into an environmental region using the first transmitter; and transmitting the fourth waveform as a fourth electromagnetic pulse into the environmental region using the second transmitter, wherein the fourth electromagnetic pulse is transmitted within 100 nanoseconds of the completion of the transmission of the third electromagnetic pulse.

17. The method according to claim 11, further comprising:
generating a filling waveform centered around a second frequency, wherein the filling waveform comprises both a horizontal polarization state and a vertical polarization state;
amplifying the filling waveform; and
transmitting the filling waveform as a third electromagnetic pulse into the environmental region, wherein the third electromagnetic pulse is transmitted within 100 nanoseconds of the completion of the transmission of the second electromagnetic pulse.

18. The method according to claim 11, further comprising:
generating a first filling waveform centered around a second frequency, wherein the first filling waveform comprises a first polarization state;
generating a second filling waveform centered around a second frequency, wherein the second filling waveform comprises a second polarization state, wherein the first polarization state and the second polarization state are orthogonal;
amplifying the first filling waveform and the second filling waveform;
transmitting the first filling waveform as a third electromagnetic pulse into the environmental region, wherein the third electromagnetic pulse is transmitted within 100 nanoseconds of the completion of the transmission of the second electromagnetic pulse; and
transmitting the second filling waveform as a fourth electromagnetic pulse into the environmental region, wherein the fourth electromagnetic pulse is transmitted within 100 nanoseconds of the completion of the transmission of the second electromagnetic pulse.

19. The method according to claim 11, wherein either the first polarization state or the second polarization state comprises a horizontal polarization state, and wherein either the first polarization state or the second polarization state comprises a vertical polarization state.

20. The method according to claim 11, wherein the second electromagnetic pulse is transmitted within 10 nanoseconds of the completion of the transmission of the first electromagnetic pulse.

\* \* \* \* \*

UNITED STATES PATENT AND TRADEMARK OFFICE
CERTIFICATE OF CORRECTION

| | | |
|---|---|---|
| PATENT NO. | : 9,778,358 B2 | |
| APPLICATION NO. | : 14/688613 | |
| DATED | : October 3, 2017 | |
| INVENTOR(S) | : Selzler et al. | |

It is certified that error appears in the above-identified patent and that said Letters Patent is hereby corrected as shown below:

In the Specification

In Column 1, Line 31, delete "processes" and insert -- process --.

In Column 1, Line 33, after "velocity" insert -- of --.

In Column 1, Line 65, after "state", delete ";" and insert a -- . --.

In Column 2, Line 49, delete "processes" and insert -- process --.

In Column 6, Line 41, delete "form" and insert -- from --.

In Column 7, Line 1, after "of" insert -- the --.

In Column 8, Line 19, after "coding" insert -- . --.

In Column 8, Line 22, after amplifier delete "315" and insert -- 320 --.

In Column 8, Line 44, after "used" insert -- to --.

In Column 8, Line 57, after "embodiments, the" delete "an".

In Column 8, Line 61, after "signal" delete "form" and insert -- from --.

In Column 8, Line 63, delete "perform" and insert -- performs --.

In Column 9, Line 35, delete "TIN." and insert -- T/N. --.

In Column 9, Line 44, after "system 400" delete "or".

Signed and Sealed this
Tenth Day of April, 2018

Andrei Iancu
*Director of the United States Patent and Trademark Office*

CERTIFICATE OF CORRECTION (continued)
U.S. Pat. No. 9,778,358 B2

In Column 9, Line 59, delete "blocks 530, 535, and 540." and insert -- blocks 530 and 535. --.

In Column 10, Line 65, delete "wave" and insert -- waveform --.

In Column 12, Line 34, delete "or".

In Column 12, Line 65, delete "555" and insert -- 560 --.

In Column 13, Line 24, delete "575" and insert -- 570 --.

In Column 13, Line 29, delete "determine" and insert -- determined --.

In Column 13, Line 45, delete "applied" and insert -- be applied --.

In Column 14, Line 10, delete "maybe" and insert -- may be --.

In Column 14, Line 64, delete "maybe" and insert -- may be --.

In Column 15, Line 4, delete "may be" and insert -- may be a --.

In Column 15, Line 7, delete "polarization" and insert -- polarization state --.

In Column 16, Line 46, delete "530" and insert -- 730 --.

In Column 17, Line 5, delete "400 or" and insert -- 400 of --.

In Column 17, Line 13, delete "first" and insert -- first waveform --.

In Column 19, Line 14, delete "first wave" and insert -- first waveform --.

In Column 21, Line 49, delete "third" and insert -- the third --.

In Column 22, Line 1, delete "complex" and insert -- first complex --.

In Column 22, Line 2, delete "complex" and insert -- second complex --.

In Column 22, Line 9, delete "signal 1220" and insert -- signal 1220, --.

In Column 22, Line 16, delete "may" and insert -- may be --.

In Column 22, Line 51, delete "able to a" and insert -- able to --.

In Column 22, Line 55, delete "able to a" and insert -- able to --.

In Column 22, Line 62, delete "the wave" and insert -- the waveform --.

In the Claims

In Column 25, Line 42, delete "processes" and insert -- process --.

In Column 25, Line 44, delete "velocity" and insert -- velocity of --.

In Column 27, Line 4, delete "processes" and insert -- process --.